(12) United States Patent
Koseki

(10) Patent No.: US 8,799,745 B2
(45) Date of Patent: Aug. 5, 2014

(54) STORAGE CONTROL APPARATUS AND ERROR CORRECTION METHOD

(75) Inventor: Hideyuki Koseki, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/125,720

(22) PCT Filed: Apr. 12, 2011

(86) PCT No.: PCT/JP2011/002173
§ 371 (c)(1),
(2), (4) Date: Sep. 23, 2011

(87) PCT Pub. No.: WO2012/140695
PCT Pub. Date: Oct. 18, 2012

(65) Prior Publication Data
US 2014/0026013 A1    Jan. 23, 2014

(51) Int. Cl.
*G11C 29/00* (2006.01)
*H03M 13/03* (2006.01)
*G06F 11/00* (2006.01)
*G06F 11/10* (2006.01)
*G06F 11/07* (2006.01)

(52) U.S. Cl.
CPC ............ *G06F 11/10* (2013.01); *G06F 11/1004* (2013.01); *G06F 11/1012* (2013.01); *G06F 11/1016* (2013.01); *G06F 11/1068* (2013.01); *G06F 11/1076* (2013.01); *G06F 11/108* (2013.01); *G06F 11/1008* (2013.01); *G06F 11/008* (2013.01); *G06F 11/07* (2013.01); *G06F 11/0727* (2013.01); *G06F 11/0754* (2013.01); *G06F 11/076* (2013.01)
USPC ........... 714/764; 714/768; 714/773; 714/774; 714/799; 714/805; 714/718; 714/6.1; 714/6.24

(58) Field of Classification Search
CPC ............................ G06F 11/10; G06F 11/1004; G06F 11/1012; G06F 11/1016; G06F 11/1068; G06F 11/1076; G06F 11/108; G06F 11/1008; G06F 11/008; G06F 11/07; G06F 11/0727; G06F 11/0754; G06F 11/076
USPC .......... 714/764, 768, 773, 774, 799, 805, 6.1, 714/6.24, 718
See application file for complete search history.

(56) References Cited

U.S. PATENT DOCUMENTS 5,402,428 A * 3/1995 Kakuta et al. ................ 714/5.11
7,810,017 B2 * 10/2010 Radke ........................... 714/769

(Continued)

FOREIGN PATENT DOCUMENTS

JP    2005-196658 A1    7/2005

*Primary Examiner* — John J Tabone, Jr.
(74) *Attorney, Agent, or Firm* — Volpe and Koenig, P.C.

(57) ABSTRACT

A controller of a storage control apparatus creates a fixed value, which is one or higher values conforming to a prescribed data pattern, with respect to first data, which is smaller than the size of a storage area of a storage device, creates a guarantee code related to a data area comprising the first data and the fixed value, and writes the data group comprising the data area and the guarantee code to the storage area. The controller reads a data group from the storage area, and determines whether or not more errors than the number of errors correctable by the guarantee code are included in this data group. In a case where the result of this determination is affirmative, the controller determines whether or not an error exists in the fixed value inside the data group. In a case where the result of this determination is affirmative, the controller corrects the fixed value, in which there is an error, to a correct fixed value, and in a case where the number of errors included in the data group is equal to or less than the number of errors correctable by the guarantee code, uses the guarantee code to correct errors in the data group.

14 Claims, 26 Drawing Sheets

(56) References Cited

U.S. PATENT DOCUMENTS

| | | | |
|---|---|---|---|
| 7,984,325 B2* | 7/2011 | Fukutomi et al. | 714/6.12 |
| 8,018,802 B2* | 9/2011 | Miura et al. | 369/47.36 |
| 8,089,717 B1* | 1/2012 | Takashi et al. | 360/51 |
| 8,381,076 B2* | 2/2013 | Radke | 714/769 |
| 8,566,675 B2* | 10/2013 | Radke | 714/774 |
| 2003/0033567 A1* | 2/2003 | Tamura et al. | 714/718 |
| 2005/0281113 A1* | 12/2005 | Yada et al. | 365/222 |
| 2005/0283647 A1 | 12/2005 | Ishidoshiro et al. | |
| 2006/0095381 A1* | 5/2006 | Yokota et al. | 705/57 |
| 2006/0206751 A1* | 9/2006 | Honda | 714/5 |
| 2009/0132755 A1* | 5/2009 | Radke | 711/103 |
| 2009/0252477 A1* | 10/2009 | Yokota et al. | 386/94 |
| 2012/0102260 A1* | 4/2012 | Kawamura et al. | 711/103 |
| 2013/0159813 A1* | 6/2013 | Radke | 714/763 |

\* cited by examiner

| Segment No. | Page No | Data type | Data Group No | Data area start offset | Fixed value start offset | ECC start offset |
|---|---|---|---|---|---|---|
| 0 | 56 | Normal | 0 | 0x0000 | N/A | N/A |
| | | | 1 | 0x0B80 | N/A | N/A |
| | | | N | 0x1700 | N/A | N/A |
| 1 | 1123 | Compress | 0 | 0x0000 | 0x03E8 | N/A |
| | | | 1 | 0x0B80 | 0x0F68 | N/A |
| | | | N | 0x1700 | 0x1AE8 | N/A |
| ... | ... | ... | ... | ... | ... | ... |
| N | M | LONG | 0 | 0x0000 | 0x03E8 | 0x05E8 |
| | | | 1 | 0x0B80 | 0x0F68 | 0x1168 |
| | | | N | 0x1700 | 0x1AE8 | 0x1CE8 |

Fig. 10

| ID 8300 | Transfer-source segment No. 8301 | Transfer-destination segment No. 8302 | Type 8303 | Fixed value data pattern 8304 |
|---|---|---|---|---|
| 0 | 12345 | 23456 | Compress | 0000 |
| ... | ... | ... | ... | ... |
| N | 34567 | 45678 | Decompress | N/A |

| ID | Execution result | Transfer type |
|---|---|---|
| 0 | OK | Compress |
| ... | ... | ... |
| N | OK | Decompress |

Fig. 12

| ID | Transfer result | Transfer type | Data Group No | Uncorrectable error flag |
|---|---|---|---|---|
| 0 | NG | Normal read | 0 | 1 |
|  |  |  | 1 | 0 |
|  |  |  | N | 0 |
| 1 | OK | Normal write | 0 | N/A |
|  |  |  | 1 | N/A |
|  |  |  | N | N/A |
| 2 | OK | Long Read | 0 | N/A |
|  |  |  | 1 | N/A |
|  |  |  | N | N/A |
| ... | ... | ... | ... | ... |
| N | OK | Long Write | 0 | N/A |
|  |  |  | 1 | N/A |
|  |  |  | N | N/A |

Fig. 14

| Physical page No. | Data Group No | Data area start offset | Fixed value start offset | Fixed value data pattern | ECC start offset |
|---|---|---|---|---|---|
| 0 | 0 | 0x0000 | 0x03E8 | 0000 | 0x0A7F |
| | 1 | 0x0B80 | 0x0F68 | 0000 | 0x15FF |
| | 2 | 0x1700 | 0x1AE8 | 0000 | 0x217F |
| 1 | 0 | 0x0000 | 0x05DC | 1111 | 0x0A7F |
| | 1 | 0x0B80 | 0x115C | 1111 | 0x15FF |
| | 2 | 0x1700 | 0x1CDC | 1111 | 0x217F |
| ... | ... | ... | ... | ... | ... |
| N | 0 | 0x0000 | 0x0708 | 0101 | 0x0A7F |
| | 1 | 0x0B80 | 0x1288 | 0101 | 0x15FF |
| | 2 | 0x1700 | 0x1E08 | 0101 | 0x217F |

Fig. 16

STORAGE CONTROL APPARATUS AND ERROR CORRECTION METHOD

TECHNICAL FIELD

The present invention relates to a technique for correcting a data error location using a guarantee code.

BACKGROUND ART

A storage apparatus comprises a storage device for storing data and a controller for controlling the storage device, and provides a large capacity data storage space to a host or computer coupled to the storage apparatus.

The storage apparatus can increase I/O processing speed and achieve high fault tolerance with respect to storage device failures by using multiple storage devices (for example HDD (Hard Disk Drives) in a RAID (Redundant Array of Independent (or Inexpensive) Disks) configuration.

The storage apparatus is generally mounted with HDDs as the storage devices, but in recent years, storage devices, which comprise flash memory, for example, SSD (Solid State Drives) are attracting attention as new storage devices for use in place of HDDs. The SSD generally comprises a NAND-type flash memory, and as such, data reads and data writes are carried out in page units.

When a long time has passed since a data was written in the flash memory, or, when the flash memory has gotten worse, bit corruption can occur in the data that has been written in the flash memory (hereinafter, a bit that has undergone bit corruption will be called an "error bit"). Consequently, to maintain the reliability of the data in a general flash memory, a guarantee code (for example, an ECC (Error Correcting Code)) is assigned to the data, and the guarantee code is written to the storage device with the data (Patent Literature 1).

CITATION LIST

Patent Literature

PTL 1: Japanese Patent Laid-open Application No. 2005-196658

SUMMARY OF INVENTION

Technical Problem

For example, in a case where the ECC is used as the guarantee code, write-target data and the ECC of this write-target data are written to the storage device together at the time of the data write, and read-target data and the ECC are read from the storage device at the time of a data read, and an error check of the read data is carried out based on this ECC. In a case where the total number of error bits are within a range that can be corrected by the ECC at this time, the error bits are corrected by inverting the relevant error bits.

However, in a case where the total number of error bits exceeds the range capable of being corrected by the ECC, error bit correction is not possible. The SSD will lose the read-target data at this time.

Furthermore, this type of error can also occur in a storage device other than the SSD (for example, the HDD).

Therefore, an object of the present invention is to heighten the probability of being able to correct data in a storage control apparatus, which corrects a data error using a guarantee code.

Solution to Problem

A storage control apparatus comprises a communication interface device, which is coupled to a storage device comprising multiple storage areas, and a controller coupled to the above-mentioned communication interface device. The controller creates a fixed value, which is a value equal to or larger than 1 corresponding to a prescribed data pattern with respect to first data that is smaller in size than a storage area, creates a guarantee code related to a data unit, which comprises the first data and the fixed value, and writes a data group comprising the data area and the guarantee code to the storage area. The controller reads the data group from the storage area, and determines whether or not this data group has more errors than the number of errors correctable by the guarantee code. In a case where the result of this determination is affirmative, the controller determines whether or not there is an error in a fixed value within the data group. In a case where the result of this determination is affirmative, the controller corrects the erroneous fixed value to a correct fixed value, which corresponds to the above-mentioned prescribed guarantee code, and in a case where the number of errors included in the data group is equal to or less than the number of errors correctable by the guarantee code, corrects the errors in the data group using the guarantee code.

The storage control apparatus may be a storage apparatus comprising a storage device. This storage apparatus may be a SSD 60, which will be described further below, or may be a storage apparatus 10, which will be described further below. The storage device may be a flash memory 780, which will be described hereinbelow, or may be the SSD 60 described hereinbelow. The controller may be a SSD controller 70, which will be described hereinbelow, or may be a storage controller 40, which will be described hereinbelow.

BRIEF DESCRIPTION OF DRAWINGS

FIG. 10 is a diagram showing an example of the configuration of a segment management table 890.

FIG. 11 is a diagram showing an example of the configuration of a transfer list 830 for a compress engine 731.

FIG. 12 is a diagram showing an example of the configuration of an end list 840 for a compress engine 731.

FIG. 14 is a diagram showing an example of the configuration of an end list 820 for a DMA engine 732.

FIG. 16 is a diagram showing an example of the configuration of a data structure management table 860.

DESCRIPTION OF THE EMBODIMENT

A number of examples of the present invention will be explained below.

Furthermore, in the following explanation, various types of information may be explained using the expression "xxx table" or "xxx list", but the various information may also be expressed using a data structure other than a table or a list. To show that the various information is not dependent on the data structure, "xxx table" or "xxx list" can be called "xxx information".

Furthermore, in the following explanation, a number is used as the identification information for an element (for example, a page), but another type of identification information (for example, a name or an identifier) may be used.

Furthermore, there may be cases hereinbelow where processing is explained having a "program" as the subject of the sentence, but since the stipulated processing may be performed in accordance with a program being executed by a processor (for example, a CPU (Central Processing Unit)) included in a controller while using a storage resource (for example, a memory) and/or a communication interface device (for example, a communication port) as needed, the processor may also be used as the subject of the processing. Furthermore, the controller may comprise a hardware circuit that carries out either part or all of the processing. A computer program may be installed in the storage control apparatus from a program source. The program source, for example, may be either a program delivery server or a computer-readable storage medium.

Furthermore, in the following explanation, the examples listed below are used to make the explanation easier to understand.

(*) The storage device is a SSD (Solid State Drive).
(*) The guarantee code is a ECC (Error Correcting Code).
(*) The storage control apparatus is a storage apparatus.

Example 1

Figure 1:
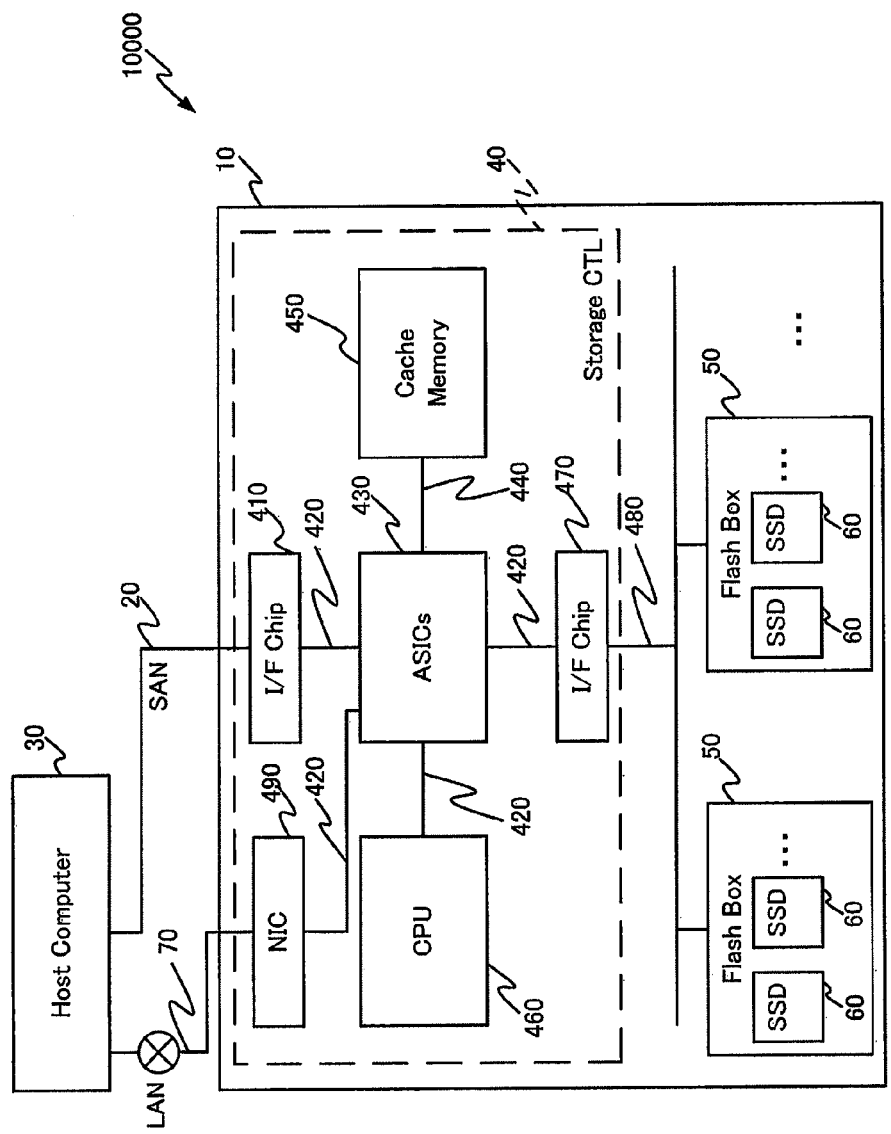
FIG. 1 is a diagram showing an example of the configuration of a storage system 10000, which comprises a storage apparatus 10 related to a first example.

FIG. 1 is a diagram showing an example of the configuration of a storage system 10000 comprising a storage apparatus 10 related to a first example.

The storage system 10000 shown in FIG. 1 comprises the storage apparatus 10 and a host computer 30.

The host computer 30 is a higher-level device, which uses the storage apparatus 10. The host computer 30, for example, is an application server. The host computer 30 and the storage apparatus 10 communicate by way of a communication network, for example, a LAN (Local Area Network) 70. Another type of communication network beside the LAN 70 can also be used.

The host computer 30 is installed with control software (not shown in the drawing) for issuing a control command to the storage apparatus 10. Executing this control command on the storage apparatus 10 make it possible to change a RAID level of a RAID group (a group comprising multiple SSDs) of the storage apparatus 10. Furthermore, another computer besides the host computer 30 can also be used as the computer for carrying out the control of storage apparatus 10 operations.

The storage apparatus 10 comprises a storage controller 40 and multiple flash boxes 50.

In addition to the LAN 70, the storage apparatus 10 and the host computer 30, for example, also communicate via a SAN (Storage Area Network) 20. For example, a Fibre Channel, a SCSI (Small Computer System Interface), a iSCSI (internet Small Computer System Interface), a USB (Universal Serial Bus), an IEEE 1394 bus, a SAS (Serial Attached SCSI) and so forth can be used as the SAN 20. Multiple host computers 30 may be coupled to the storage apparatus 10. Furthermore, another type of interface can also be used instead of the SAN 20. Another type of communication network may be used instead of either one of the LAN 70 or the SAN 20. The storage apparatus 10 and the host computer 30 may be coupled to a single communication network instead of being coupled to multiple communication networks like the LAN 70 and the SAN 20.

The storage controller 40 controls the operations of the storage apparatus 10. The storage controller 40 comprises ASICs (Application Specific Integrated Circuits) 430, a cache memory 450, a CPU (Central Processing Unit) 460, I/F chips (410, 470), and a NIC (Network Interface Card) 490.

The ASICs 430 are integrated circuits that perform parity operations when constructing a RAID. The CPU 460 controls the entire storage apparatus 10. The cache memory 450 is an area for storing a computer program and data that the CPU 460 needs to control the storage apparatus 10. The I/F chip 410 is an interface for coupling the storage apparatus 10 to the SAN 20. The I/F chip 470 is an interface for coupling the storage controller 40 and flash boxes 50 via a dedicated interconnection bus 480 (for example, SAS (Serial Attached SCSI), Fibre Channel, or PCI (Peripheral Component Interconnect).

The I/F chips (410, 470), the NIC 490, and the CPU 460, for example, are coupled to the ASICs 430 by a dedicated interconnection bus 420 like a PCI (Peripheral Component Interconnect). The cache memory 450 is coupled to the ASICs 430 by a dedicated interconnection bus 440 like a DDR3 (Double Data Rate 3).

The storage controller 40 carries out access to a flash memory 780 via a SSD controller 70, which will be described further below.

The flash box 50 comprises multiple SSD. A RAID group (for example, a RAID5 and RAID10) is constructed from multiple SSDs 60 by the storage controller 40. Then, a storage area (logical volume), which is based on the respective RAID groups, is provided to the host compute 30 by the storage controller 40.

Figure 2:
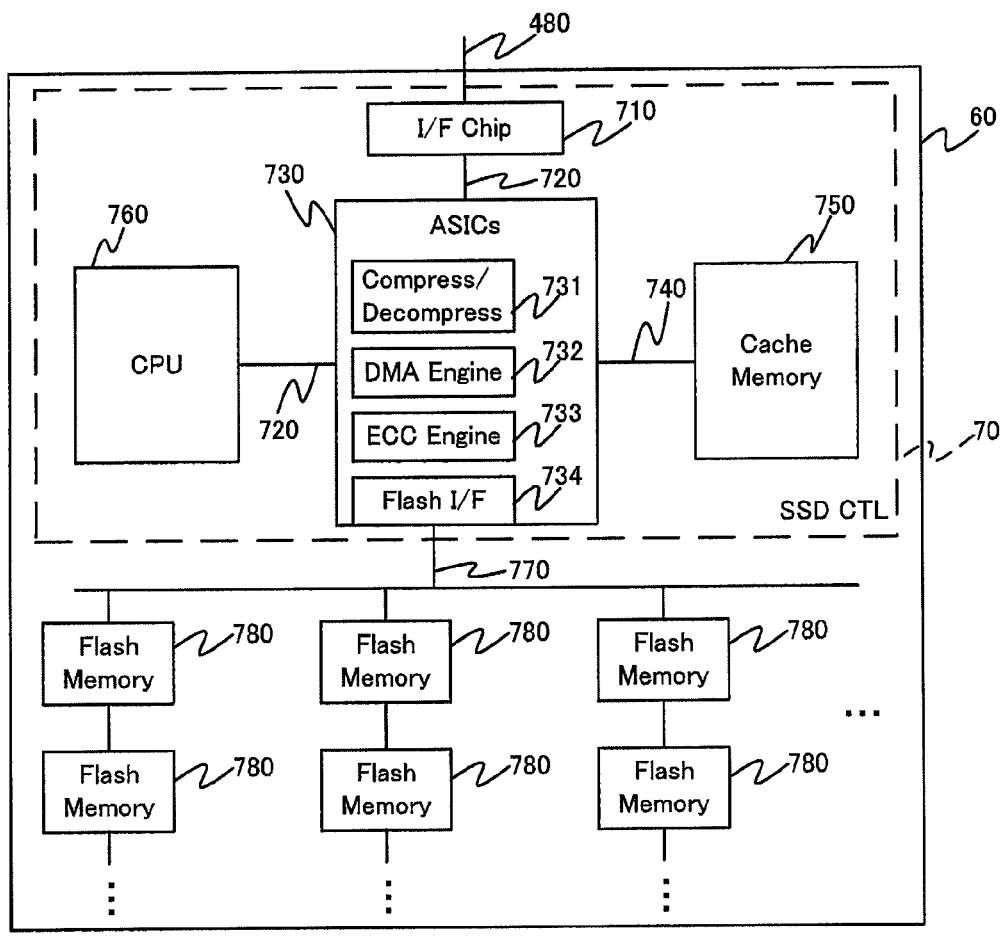
FIG. 2 is a diagram showing an example of the configuration of a SSD 60.

FIG. 2 shows an example of the configuration of the SSD 60.

The SSD 60 comprises a SSD controller 70 and multiple flash memories 780. The SSD controller 70 controls the operation of the SSD 60.

The SSD controller 70 comprises ASICs 730, a CPU 760, a cache memory 750, and a I/F chip 710.

The ASICs 730 comprise a compress/decompress engine 731 (hereinafter, the compress engine 731), a DMA engine 732, an ECC engine 733, and a flash I/F 734. The compress engine 731 is for compressing and decompressing data. The DMA engine 732 is a DMA circuit for executing a DMA transfer between the cache memory 750 and the flash memory 780. The ECC engine 733 is a circuit for creating an ECC in and carrying out an error check of data stored in the flash memory 780. The flash I/F 734 is an interface for coupling the flash memory 780 to the SSD controller 70. The CPU 760 controls the SSD 60. The cache memory 750 is an area for storing a computer program and data that the CPU 760 needs for controlling the SSD 60. The I/F chip 710 is an interface for coupling the storage controller 40 and the SSD controller 70 via the above-mentioned dedicated interconnection bus 480.

The SSD controller 70 and the flash memory 780 are coupled by a dedicated interconnection bus 770 via the flash I/F 734.

Figure 3:
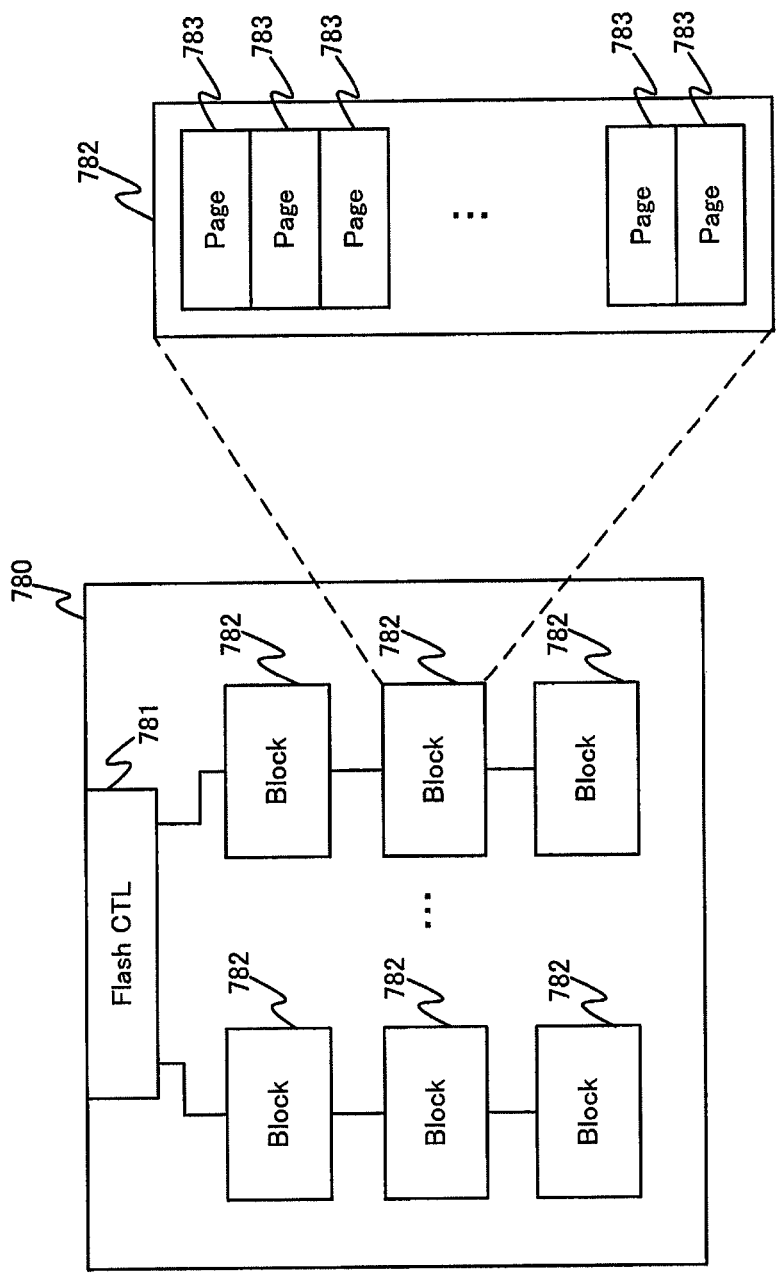
FIG. 3 is a diagram showing an example of the configuration of a flash memory 780.

FIG. 3 is a diagram showing an example of the configuration of the flash memory 780.

The flash memory 780 comprises a flash memory controller 781 and multiple blocks 782. The flash memory controller (hereinafter, the flash controller) 781 controls the flash memory 780. Each block 782 comprises multiple pages 783. A data read from the flash memory 780 and a data write to the flash memory 780 are executed in page units, and a data erase is executed in block units. Furthermore, a data write must be executed with respect to an erased page. That is, the flash memory 780, for example, is a NAND-type flash memory.

Figure 4:
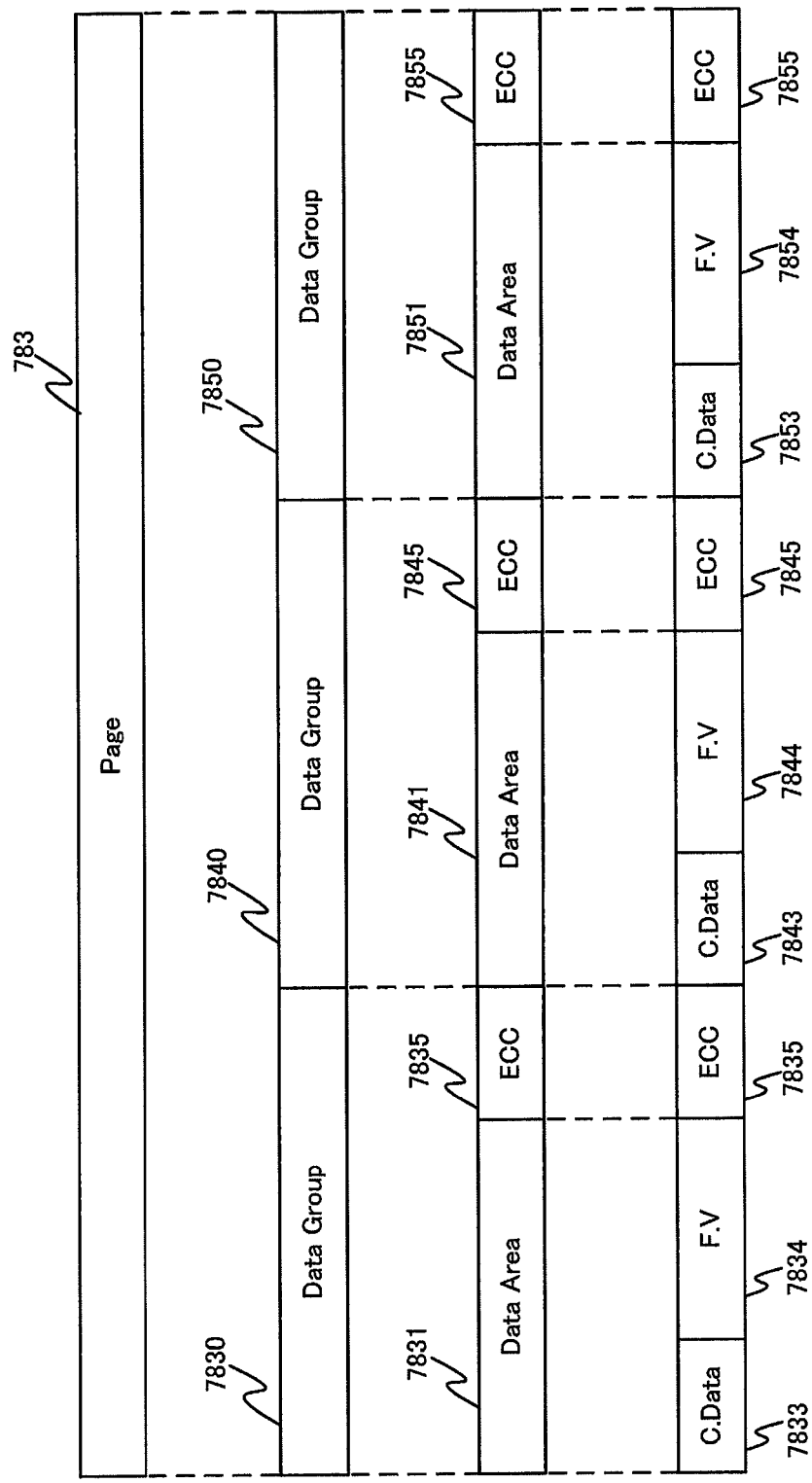
FIG. 4 is a diagram showing an example of the configuration of a page 783.

FIG. 4 is a diagram showing an example of the configuration of the page 783.

Furthermore, in the following explanation, "C. Data" in the drawing is the abbreviation for compressed data. Furthermore, F.V is the abbreviation for fixed value.

The page 783 can store multiple data groups. In the example of FIG. 4, the page 783 comprises three data groups (7830, 7840, and 7850). Each page in this example will be explained hereinbelow as comprising three data groups, but the number of data groups comprising each page 783 is not limited to three.

Furthermore, in the explanation below, the following will be assumed to make the explanation easier to understand.

(*) In a case where no particular distinction is made between the data groups (7830, 7840, 7850), "data group" will be used without the reference sign.
(*) In a case where no particular distinction is made between the data areas (7831, 7841, 7851), "data area" will be used without the reference sign.
(*) In a case where no particular distinction is made between the compressed data (7833, 7843, 7853), "compressed data" will be used without the reference sign.
(*) In a case where no particular distinction is made between the fixed values (7834, 7844, 7854), "fixed value" will be used without the reference sign.
(*) In a case where no particular distinction is made between the ECCs (7835, 7845, 7855), "ECC" will be used without the reference sign.

The data group comprises the data area and the ECC. Specifically, the data group 7830 comprises the data area 7831 and the ECC 7835, the data group 7840 comprises the data area 7841 and the ECC 7845, and, in addition, the data group 7850 comprises the data area 7851 and the ECC 7855.

Using the ECC, it is possible to correct at least one part of the data area corresponding to this ECC. Specifically, at least a part of the data area 7831 can be corrected using the ECC 7835, at least a part of the data area 7841 can be corrected using the ECC 7845, and at least a part of the data area 7851 can be corrected using the ECC 7855.

The data area comprises compressed data and a fixed value. Specifically, the data area 7831 comprises the compressed data 7833 and the fixed value 7834, the data area 7841 comprises the compressed data 7843 and the fixed value 7844, and the data area 7851 comprises the compressed data 7853 and the fixed value 7854. Furthermore, the compressed data and the fixed value will be explained in detail further below. In addition, the CPU 760 manages the storage location inside the page 783 of the fixed value (7834, 7844, 7854) using this value and a data structure management table 860, which will be explained separately.

Figure 5:
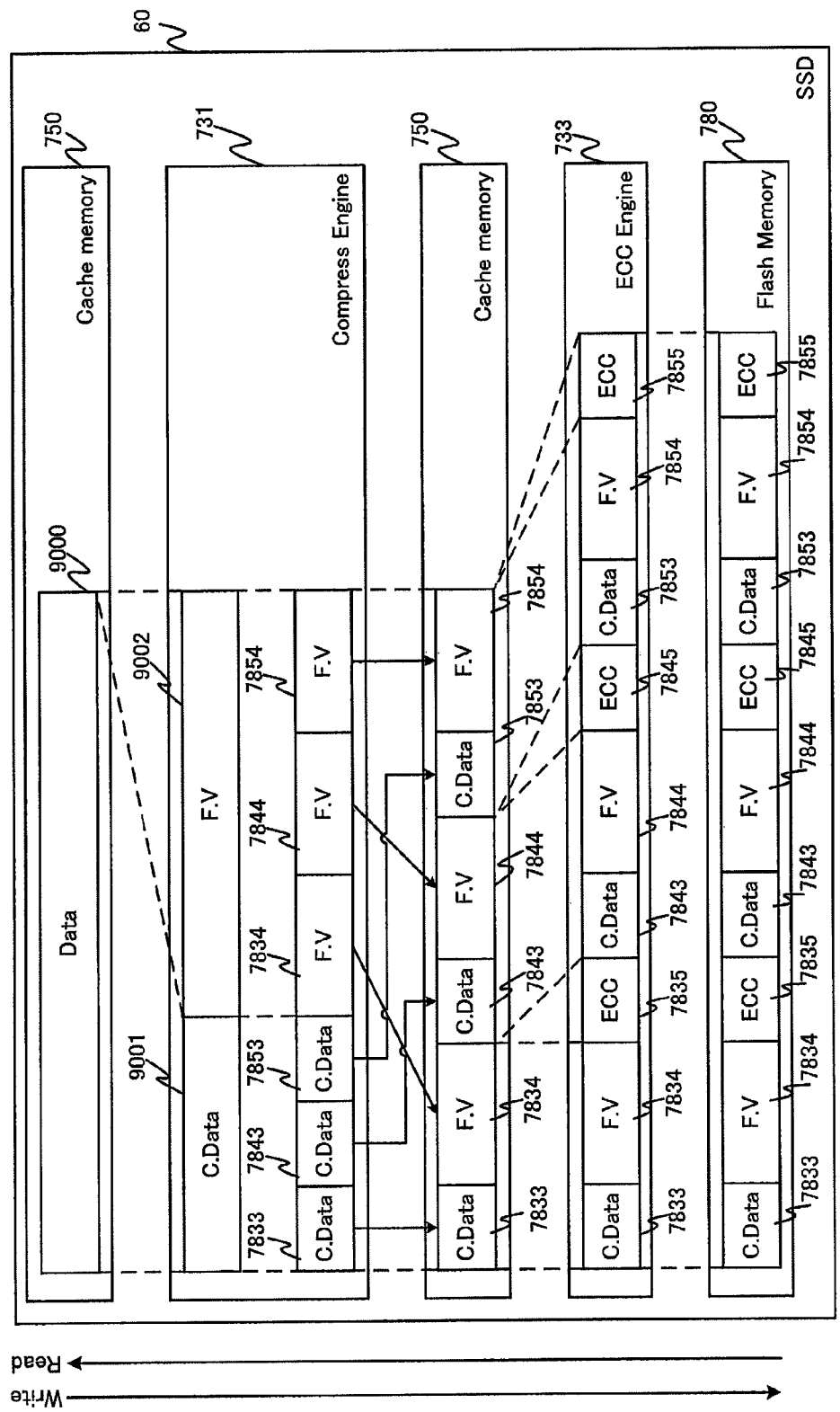
FIG. 5 is a schematic diagram of an example of storing data in the SSD 60.

FIG. 5 is a schematic diagram of an example of storing data in the SSD 60.

A data write process to the SSD (hereinafter, the SSD write) and a data read process from the SSD (hereinafter, the SSD read) will be explained below.

(SSD Write)

Data 9000 is data that is transferred between the SSD 60 and the storage controller 40. The SSD 60, upon receiving data from the storage controller 40, first stores the received data in the cache memory 750. Next, the SSD controller 70 uses the compress engine 731 to compress the received data 9000 and create compressed data 9001. It is preferable that the size of the compressed data 9001 be equal to or less than the size of the data that can be restored using the ECC. The compress engine 731 creates a fixed value 9002 that is the same size as the proportion by which the size of the data 9000 was reduced in accordance with compression. This fixed value 9002 stores prescribed data (a bit array) known to the CPU 760, such as a pattern of all 1's such as 1111 . . . , a pattern of all 0's such as 0000 . . . , or a repeating pattern of 1's and 0's such as 1010 . . . . In accordance with this, in a case where an error occurs in the fixed value 9002, the CPU 760 can identify the location of this error, and, in addition, revise the identified error location without using the ECC. Furthermore, there are data patterns that are resistant to the occurrence of an error bit, and the configurations of these data patterns are a function of the flash memory type (for example, NAND, NOR, and so forth) (that is, the configuration of a data pattern that is resistant to error bits will differ in accordance with the type of the flash memory), and an identified data pattern that is resistant to the occurrence of an error bit (resistant to data corruption) based on the flash memory type may be used as the fixed value 9002.

The compress engine 731 respectively partitions the compressed data 9001 and the fixed value 9002 into three parts, creating a data area comprising the compressed data 7833 and the fixed value 7834, a data area comprising the compressed data 7843 and the fixed value 7844, and a data area comprising the compressed data 7853 and the fixed value 7854. Then, the compress engine 731 respectively transfers the created three data areas to the cache memory 750. Furthermore, the number of partitions is not limited to three, and may be fewer or greater than three.

Thereafter, an ECC is assigned by the ECC engine 733 to each data area stored in the cache memory 750, and this ECC-appended data area is stored in the flash memory as a data group.

(SSD Read)

At the time of a data read, the flow is the opposite that of a write. First, the data is transferred from the flash memory 780 to the cache memory 750. At this time, the ECC engine 733 uses the ECC to perform a data error check with respect to each data group.

In a case where the total number of error bits in the data group is within the range capable of being corrected by the ECC, the ECC engine 733 performs error correction. The data group ECC is deleted, and only the compressed data and fixed value are transferred to the cache memory 750. As for the compressed data and fixed value that were transferred to the cache memory 750, the compress engine 731 deletes the fixed value and decompresses the compressed data, thereby restoring the data 9000. The restored data 9000 is transferred from the compress engine 731 to the cache memory 750, and thereafter transferred to the storage controller 40.

Alternatively, in a case where the total number of data group error bits exceeds the ECC correctable range, error correction using the ECC is not possible. To simplify the explanation, an error for which error correction is not possible using the ECC like this will be called an "uncorrectable error" hereinbelow.

Next, data read and write operations between the cache memory 750 and the flash memory 780 will be explained. In this example, two types of transfer methods are defined: "normal read/normal write" and "long read/long write". Details will be explained using FIGS. 6 and 7.

Although explained further below, the "normal read/normal write" is a data transfer method carried out between the cache memory 750 and the flash memory 780 via the ECC engine 733. The "long read/long write" is a data transfer method carried out between the cache memory 750 and the flash memory 780 by bypassing the ECC engine 733 in a case where an uncorrectable error has occurred.

(Normal Read/Normal Write)

Figure 6:
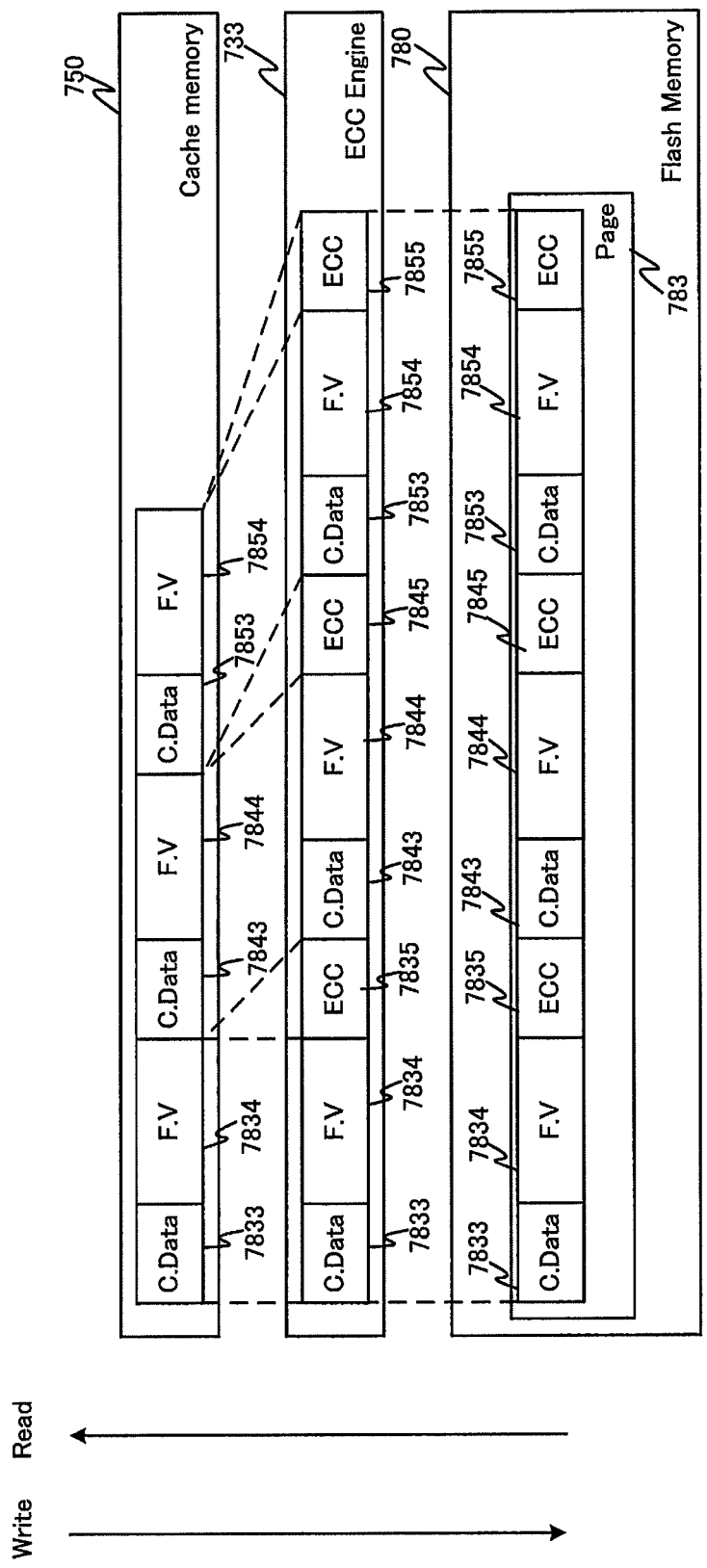
FIG. 6 is a schematic diagram of an ordinary read and an ordinary write.

FIG. 6 is a schematic diagram of a normal read and a normal write.

The details of the normal read and the normal write are the same as the data transfer method between the cache memory 750 and the flash memory 780 in FIG. 5. In the case of a write, the ECC engine 733 assigns an ECC to this data area, and a data area-ECC set is stored in the flash memory 780. In the case of a read, the data group is subjected to an error check by the ECC engine 733. In a case where the errors can be corrected, the ECC engine 733 corrects these errors and, in addition, deletes the ECC, and stores the result in the cache memory 750.

(Long Read/Long Write)

Figure 7:
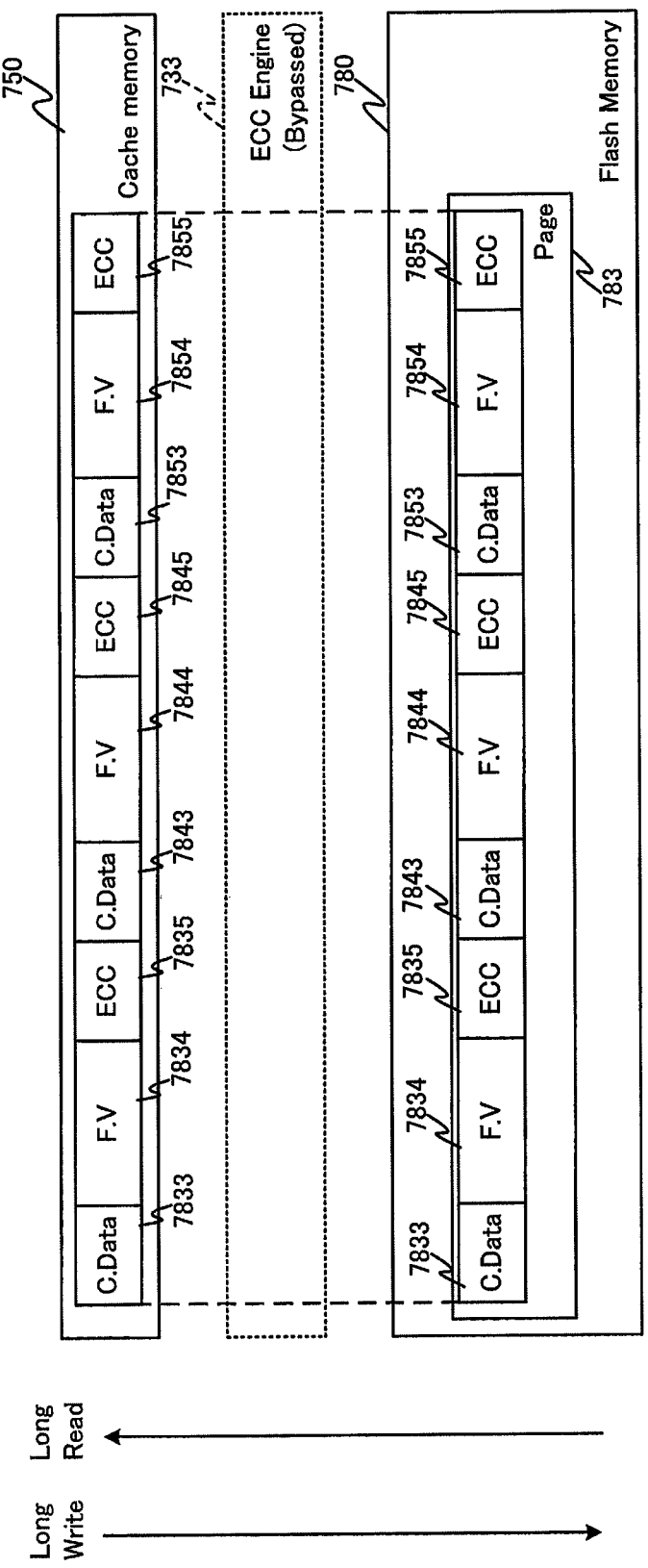
FIG. 7 is a schematic diagram of a long read and a long write.

FIG. 7 is a schematic diagram of a long read and a long write.

A long read and a long write, unlike a normal read and a normal write, bypass the ECC engine 733 and do not pass the data through the ECC engine 733.

Because an error check, error correction, and ECC deletion are not performed in a long read, the data in the page 783 is transferred to the cache memory 750 in a state in which the ECC is appended, that is, as-is as the data group.

A long write is a process that is carried out after the long read, and the data group stored in the cache memory 750 is transferred to the flash memory 780 with the ECC appended as-is without passing through the ECC engine 733.

An overview of means for recovering data from an uncorrectable error using the above-mentioned transfer methods will be explained in accordance with FIG. 8.

Figure 8:
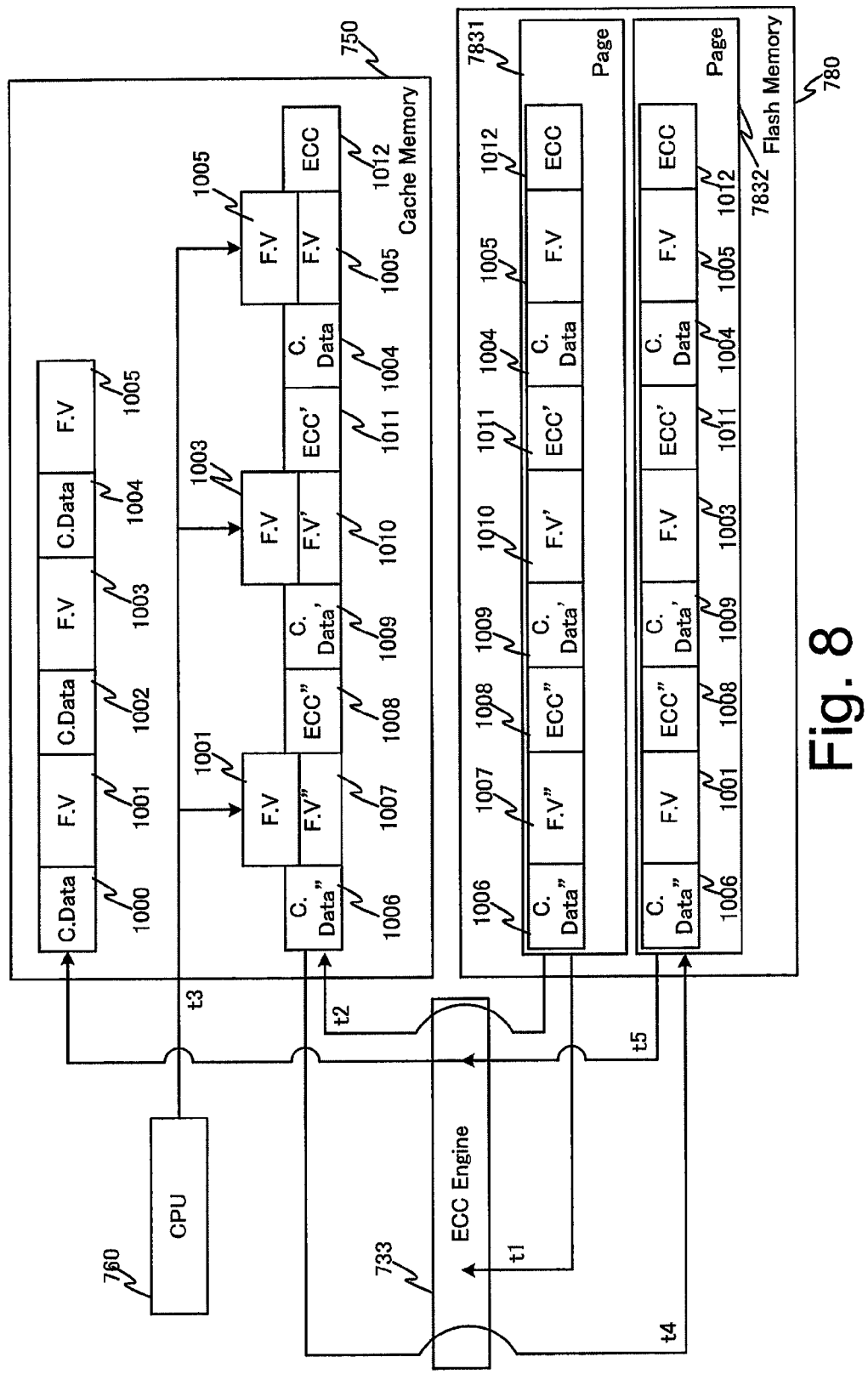
FIG. 8 is a diagram showing an example of an overview depicting a data recovery procedure.

FIG. 8 is an outline diagram showing a data recovery procedure.

An explanation will be given of a case in which read-target data is stored in the page 7831. The data stored in the flash memory 780 here is classified as double quotation mark ("), single quotation mark (') and unmarked. First, data with a double quotation mark (") attached indicates that the total number of error bits exceeds ECC correction capabilities, and that correction is not possible using the ECC. In the drawing, the compressed data 1006, the fixed value 1007, and the ECC 1008 correspond to this double quotation mark data. That is, this signifies that the total value of the error bits of the data group comprising the compressed data 1006, the fixed value 1007, and the ECC 1008 exceeds ECC correction capabilities. Furthermore, although not shown in the drawing, the compressed data 1006, the fixed value 1007, and the ECC 1008 belong to the same data group.

The data with the single quotation mark (') attached indicates that although error bits have occurred, the total number thereof is within the correction capabilities of the ECC, and error correction using the ECC is possible. In the drawing, the compressed data 1009, the fixed value 1010, and the ECC 1011 correspond to this single quotation mark data. That is, this indicates that the total number of error bits of the data group comprising the compressed data 1009, the fixed value 1010, and the ECC 1011 is within the range of the ECC correction capabilities. Furthermore, although not shown in the drawing, the compressed data 1009, the fixed value 1010, and the ECC 1011 belong to the same data group.

Furthermore, the unmarked data indicates that error bits have not occurred. In the drawing, the compressed data 1004, the fixed value 1005, and the ECC 1012 correspond to this unmarked data. That is, this indicates that error bits have not occurred in the data group comprising the compressed data 1004, the fixed value 1005, and the ECC 1012. Furthermore, although not shown in the drawing, the compressed data 1004, the fixed value 1005, and the ECC 1012 belong to the same data group.

In the drawing, t1 through t5 denote the passage of time. The flow of a data recovery process will be explained in sequence hereinbelow. Furthermore, in the following explanation, an aggregate of multiple data groups stored in a single page will be called a "data group set". A data group set is either written or read in a page-unit write and read.

First, the CPU 760 carries out a read of the data group set (hereinafter, the first data group set) stored in the page 7831 in accordance with a normal read. Because a data group with uncorrectable errors (compressed data 1006, fixed value 1007, and ECC 1008) is included in the first data group set at this time, the ECC engine 733 detects the uncorrectable error, and notifies the CPU 760 of this detection result (t1).

In this case, the CPU 760 attempts to recover the data that is stored in this page in accordance with the processing from t2 through t5 hereinbelow. First, the CPU 760, which received the notification of the uncorrectable error, carries out a long read. In accordance with this, the first data group set is transferred from the page 7831 to the cache memory 750 as-is bypassing the ECC engine 733 (t2).

The CPU 760 discerns the storage locations of the fixed values (1007, 1010, 1005) in the data groups, and the configuration of each fixed value (which bits have which values in the fixed value). For this reason, the CPU 760 is able to correct each fixed value in the cache memory 750 to the correct fixed value. That is, the CPU 760 corrects the fixed value 1007 comprising an error bit to the correct fixed value 1001 and corrects the fixed value 1010 comprising an error bit to the correct fixed value 1003. The CPU 760 also overwrites the fixed value 1005 that does not include an error bit with the same fixed value 1005 (t3). As a result of this, the first data group set is converted to a second data group set. The fixed value comprising the error bit is not included in the second data group set.

Next, the CPU 760 carries out a long write. In accordance with this, the second data group set is transferred from the cache memory 750 to the flash memory 780 by bypassing the ECC engine 733. This process is carried out in order for the ECC engine 733 to check each data group comprising correct fixed value afterwards (at t5). The ECC engine 733 is only able to check a data group that is stored in the flash memory 780. Due to the characteristics of the flash memory 780, it is not possible to overwrite the data group set on the same page at this time without erasing. For this reason, the CPU 760 stores the second data group set in the free page 7832, which differs from the page 7831 (t4). Due to the characteristics of the flash memory 780, a free page other than the write destination here may be a page in the block comprising the read-source page at the above-mentioned (t1).

Thereafter, the CPU 760 reads the second data group set from the page 7832, that is, executes a normal read. Since the fixed value 1007 of the data group (compressed data 1006, fixed value 1007, and ECC 1008) in which the uncorrectable error had occurred in the page 7831 was restored to the fixed value 1001, which is the correct value, the data group in which the uncorrectable error occurred is not included in the second data group set read in this normal read.

In a case where the total number of error bits in the compressed data 1006 and the ECC 1008 falls within the range of the correction capabilities of the ECC 1008, the ECC engine 733 uses the ECC 1008 to correct the errors in the compressed data 1006 and/or the ECC 1008. Then, the ECC 1008 is deleted, and the correct compressed data 1000 and fixed value 1001 are transferred to the cache memory 750.

Furthermore, with respect to the data group (compressed data 1009, fixed value 1010, ECC 1011) in which the uncorrectable error in the page 7831 did not occur, the ECC engine 733 uses the ECC 1011 to correct the errors, deletes the ECC 1011, and transfers the correct compressed data 1002 and fixed value 1003 to the cache memory 750.

In addition, with respect to the data group (compressed data 1004, fixed value 1005, ECC 1012) in which an error did not occur, the ECC engine 733 deletes the ECC 1012, and transfers the compressed data 1004 and the fixed value 1005 to the cache memory 750.

Even when an uncorrectable error occurs in this example like this, steps are taken to enable the error to be corrected. That is, the data to be written from the cache memory 750 to the flash memory 780 (for example, write-target data received from the host computer 30) (may include parity data) is compressed. Then, a fixed value, which is the same size as the proportion by which the size of the data was reduced in accordance with compression, is written to the cache memory 750. Then, a data area, which is a set of the compressed data and the fixed value, and a data group comprising the ECC are written to the flash memory 780.

In a case where a data group set is read from a page, first fixed value error correction is carried out with respect to the data group in which an uncorrectable error occurred. The fixed value error correction can be carried out without using the ECC in the data group comprising this fixed value. That is, the total number of error bits in the data group (the total number of error bits in the compressed data and ECC) can be expected to fall within the correctable range of the ECC by correcting the fixed value without using the ECC. In a case where the total number of error bits of the data group fall within the range capable of being corrected by the ECC, error correction can be executed using the ECC. That is, data recovery from an uncorrectable error can be expected to be realized.

Figure 9:
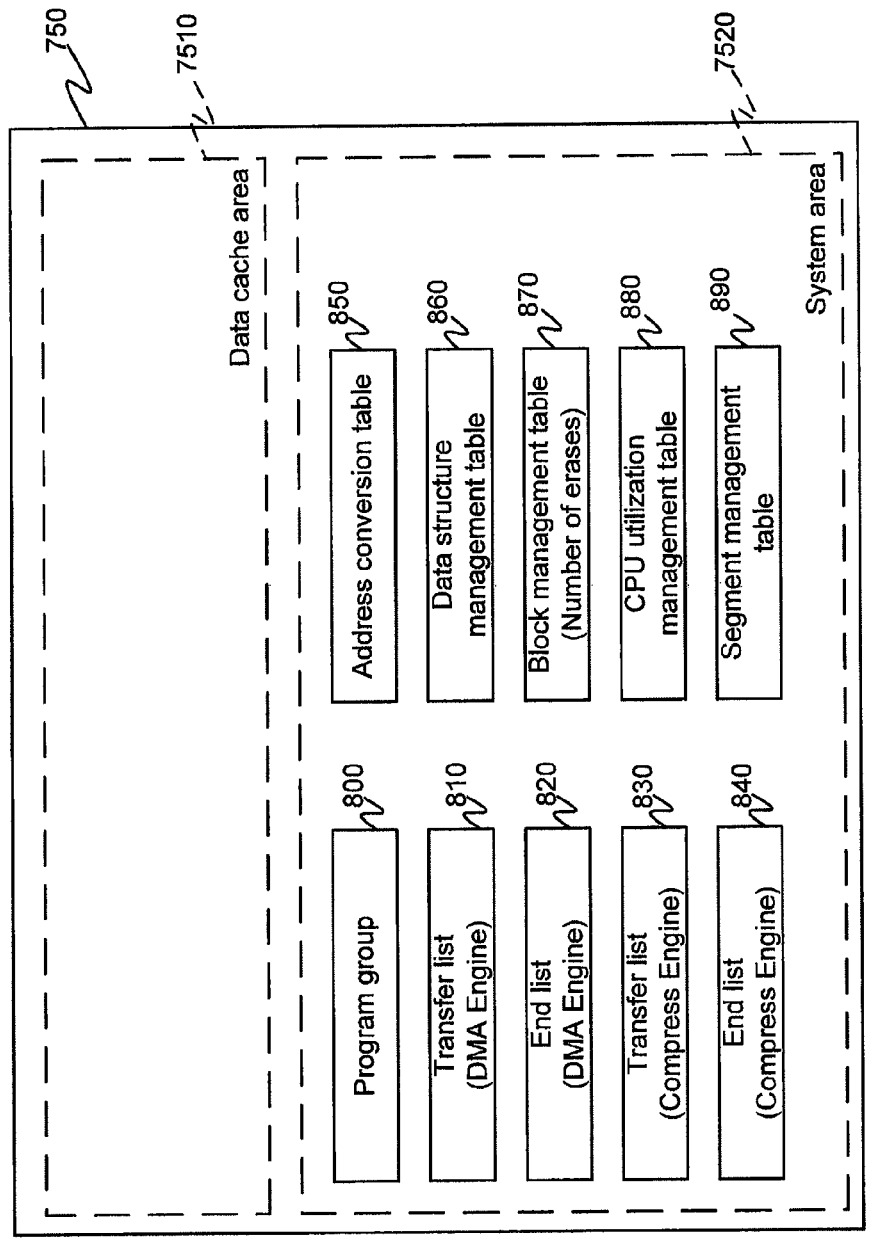
FIG. 9 is a diagram showing an example of the configuration of a cache memory 750.

FIG. 9 is a diagram showing an example of the configuration of the cache memory 750.

The cache memory 750 comprises a data cache area 7510 and a system area 7520. The data cache area 7510 is used for temporarily storing user data. The system area 7520 is an area in which programs and various types of tables for controlling the storage apparatus 10 are stored.

The data cache memory 7510, although not shown in the drawing, is partitioned into multiple cache segments of an arbitrary size, and data is stored in cache segment units.

The system area 7520 stores a program group 800, a DMA engine transfer list 810, a DMA engine end list 820, a compress engine transfer list 830, a compress engine end list 840, an address conversion table 850, a data structure management table 860, a block management table 870, a CPU utilization management table 880 and a segment management table 890.

The program group 800 is various programs executed by the CPU 760. The DMA engine transfer list 810 and the DMA engine end list 820 are information used by the CPU 760 to control the DMA engine 732 of the ASICs 730. The lists 810 and 820 are prepared by the CPU 760 and are used as needed by the DMA engine 732 (and the ECC engine 733). The CPU 760 is able to discern states from the lists 810 and 820. The compress engine transfer list 830 and the compress engine end list 840 are information used by the CPU 760 for controlling the compress engines 731 of the ASICs 730. The lists 830 and 840 are prepared by the CPU 760, and are used as needed by the compress engine 731. The CPU 760 is able to discern states from the lists 830 and 840. The address conversion table 850 is information used to manage the corresponding relationship between a logical address space that the SSD 60 provides to the storage controller or the host computer 30, which are higher-level devices, and the page 783, which is the actual data storage destination. The data structure management table 860 is information used for managing the type, location, size and so forth of data stored in a page. The block management table 870 comprises management information such as the number of erases of a block 782. The CPU utilization management table 880 comprises information denoting the utilization of resources by the CPU 760. The segment management table 890 comprises information related to the segments of the cache memory 750.

FIG. 10 is a diagram showing an example of the configuration of the segment management table 890.

The segment management table 890 comprises for each segment a segment no. 8900, a page no. 8901, a data type 8902, a data group no. 8903, a data area start offset 8904, a fixed value start offset 8905, and a ECC start offset 8906.

The segment no. 8900 is a segment identifier (for example, a unique numerical value). The page no. 8901 is the number of a page, which is the actual storage destination of a data group set stored in the segment.

The data type 8902 is information denoting the type of the data stored in the segment. In this example, there are three types of data in accordance with the state of the stored data, i.e., "Normal", "Compress" and "Long".

(*) "Normal" indicates that decompressed data is stored in the segment.

(*) "Compress" indicates that compressed data and a fixed value are stored in the segment.

(*) "Long" indicates that a data group set, which has undergone a long read, is stored in the segment.

The data group no. 8903 is the number of a data group. In a case were a data group set is stored in a single segment, there will be multiple data groups in a single segment, and the data group no. 8903 comprises the number of each data group.

The data area start offset 8904 is information (information indicating the offset from the start of the segment) showing the storage start location of the compressed data. The fixed value start offset 8905 is information (information indicating the offset from the start of the segment) showing the storage start location of the fixed value. The ECC start offset 8906 is information (information indicating the offset from the start of the segment) showing the storage start location of the ECC.

Because a fixed value and an ECC are not stored in a segment for which the data type 8902 is "Normal", the fixed value start offset 8905 and the ECC start offset 8906 corresponding to this segment are "N/A", indicating invalid. Furthermore, because an ECC is not stored in a segment for which the data type 8902 is "Compress", the ECC start offset 8906 corresponding to this segment is "N/A".

FIG. 11 is a diagram showing an example of the configuration of the compress engine 731 transfer list 830.

The transfer list 830 comprises an ID 8300, a transfer-source segment no. 8301, a transfer-destination segment no. 8302, a type 8303, and a fixed value data pattern 8304 for each piece of data to be transferred to the compress engine 731.

The ID 8300 is a unique number that is allocated for each transfer, and is for enabling the compress engine 731 to carry out multiple processes in parallel. The transfer-source segment no. 8301 is the number of the segment in which either data to be compressed or data that is targeted for decompression is to be stored. The transfer-destination segment no. 8302 is the number of the segment in which either compressed data or decompressed data is to be stored. The type 8303 is information denoting the type of operation of the compress engine 731. In a case where the operation is compression, the type 8303 is "Compress", in a case where the operation is decompression, the type 8303 is "Decompress". The fixed value data pattern 8304 denotes the data pattern of the fixed value. At compression time, the compress engine 731 creates a fixed value based on a numerical value inputted in this field. Alternatively, in the case of a decompression, the fixed value is deleted, and "N/A", which indicates invalid, is inputted to this field.

Furthermore, in a case where either compression or decompression is carried out, the compress engine 731, by referring to the segment management table 890, acquires either compress- or decompress-target data based on the information in the transfer-source and transfer-destination segments, and the values of the transfer-source segment no. 8301 and the transfer-destination segment no. 8302.

FIG. 12 is a diagram showing an example of the configuration of the compress engine 731 end list 840.

The compress engine 731 end list 840 comprises an ID 8400, an execution result 8401, and a transfer type 8402 for each piece of compress- or decompress-target data.

The ID 8400 corresponds to the ID 8300 of the transfer list 830, and is information for learning which data transfer has ended. The execution result 8401 is information (either "OK" or "NG") denoting the result of either a data compression or decompression process. The transfer type 8402 denotes the type of operation, and the same type value as that of the type 8303 of the transfer list 830 is used.

Figure 13:
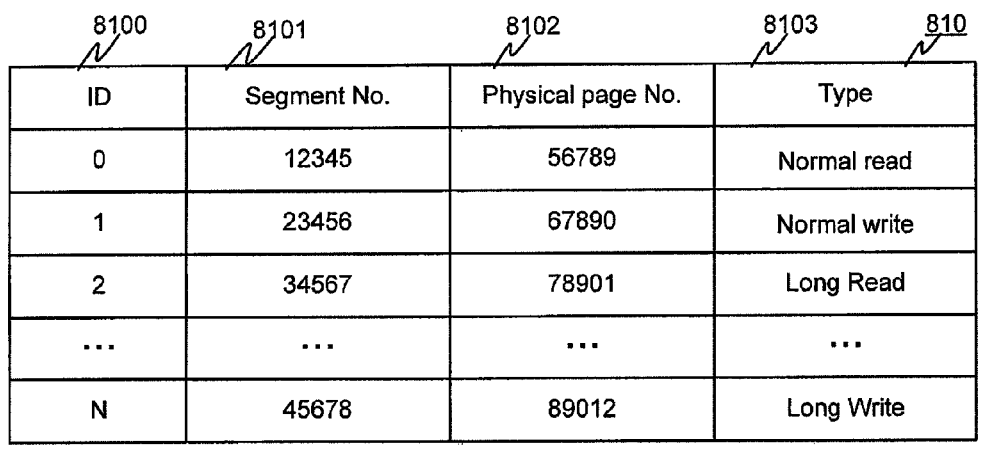
FIG. 13 is a diagram showing an example of the configuration of a transfer list 810 for a DMA engine 732.

FIG. 13 is a diagram showing an example of the configuration of the DMA engine 732 transfer list 810.

The DMA engine 732 transfer list 810 comprises an ID 8100, a segment no. 8101, a physical page no. 8102, and a type 8103 for each piece of data to be transferred via the DMA.

The ID 8100 is the transfer identifier (a unique number for each piece of DMA-transferred data). The segment no. 8101 and the physical page no. 8102 are information denoting the location of the segment and the location of the page that constitutes either the transfer source or the transfer destination. The type 8103 is information denoting the type of DMA transfer between the cache memory 750 and the flash memory 780, and specifically, for example, the values of the above-mentioned four types, i.e., "normal read", "normal write", "long read" and "long write", are used.

FIG. 14 is a diagram showing an example of the configuration of the DMA engine 732 end list 820.

The DMA engine 732 end list 820 comprises an ID 8200, a transfer result 8201, a transfer type 8202, a data group no. 8203, and an uncorrectable error flag 8204 for each piece of DMA-transferred data.

The ID 8200 is information corresponding to the ID 8100 of the transfer list 810. The transfer result 8201 is information denoting the result of a DMA transfer, and indicates whether or not the relevant transfer ended normally. "OK" shows that a transfer ended normally. "NG" shows that a transfer did not end normally. The transfer type 8202 is information denoting the type of operation, and the same value as that of type 8103 of the transfer list 810 is used. The data group no. 8203 is the number of a data group comprising a page 780. The uncorrectable error flag 8204 is information denoting the result of an error check by the ECC engine 733 as to whether or not an uncorrectable error has occurred in the relevant data group. This information is "1" in a case where an uncorrectable error has occurred, and "0" in a case where there is no uncorrectable error.

Furthermore, in a case where the transfer type 8202 is "normal read", the transfer result 8201 will only be "OK" when all the uncorrectable error flags are "0". Alternatively, in a case where the transfer type 8202 is "normal write", "long read" or "long write", the ECC engine 733 does not carry out an error check, which results in the uncorrectable error flag 8204 being "N/A", which denotes invalid.

Figure 15:
FIG. 15 is a diagram showing an example of the configuration of an address conversion table 850.

FIG. 15 is a diagram showing an example of the configuration of the address conversion table 850.

The address conversion table 850 denotes the corresponding relationship between the logical page and the physical page. Specifically, for example, this table 850 comprises a logical page no. 8500 and a physical page no. 8501.

The logical page no. 8500 is a numerical value (a unique value) determined in accordance with the quotient when a LBA (Logical Block Address), which is the logical address provided to the storage controller 40 or the host computer 30, is divided by the size of the page 780. The physical page no. 8501 is a number of a physical page (a page in the flash memory), which corresponds to the logical page corresponding to the logical page no. 8500.

FIG. 16 is a diagram showing an example of the configuration of the data structure management table 860.

The data structure management table 860 comprises a physical page no. 8600, a data group no. 8601, a data area start offset 8602, a fixed value start offset 8603, a fixed value data pattern 8604, and an ECC start offset 8605 for each page (physical page) comprising the flash memory 780.

The physical page no. 8600 is the number (identifier) of a page 780. The data group no. 8601 is the number (identifier) of a data group stored in a page. The data area start offset 8602 is information (information denoting the offset from the start of the page) denoting the storage start location of the compressed data. The fixed value start offset 8603 is information (information denoting the offset from the start of the page) denoting the storage start location of the fixed value. The fixed value data pattern 8604 is information denoting the configuration (data pattern) of the fixed value. The ECC start offset 8605 is information (information denoting the offset from the start of the page) denoting the storage start location of the ECC.

Figure 17:
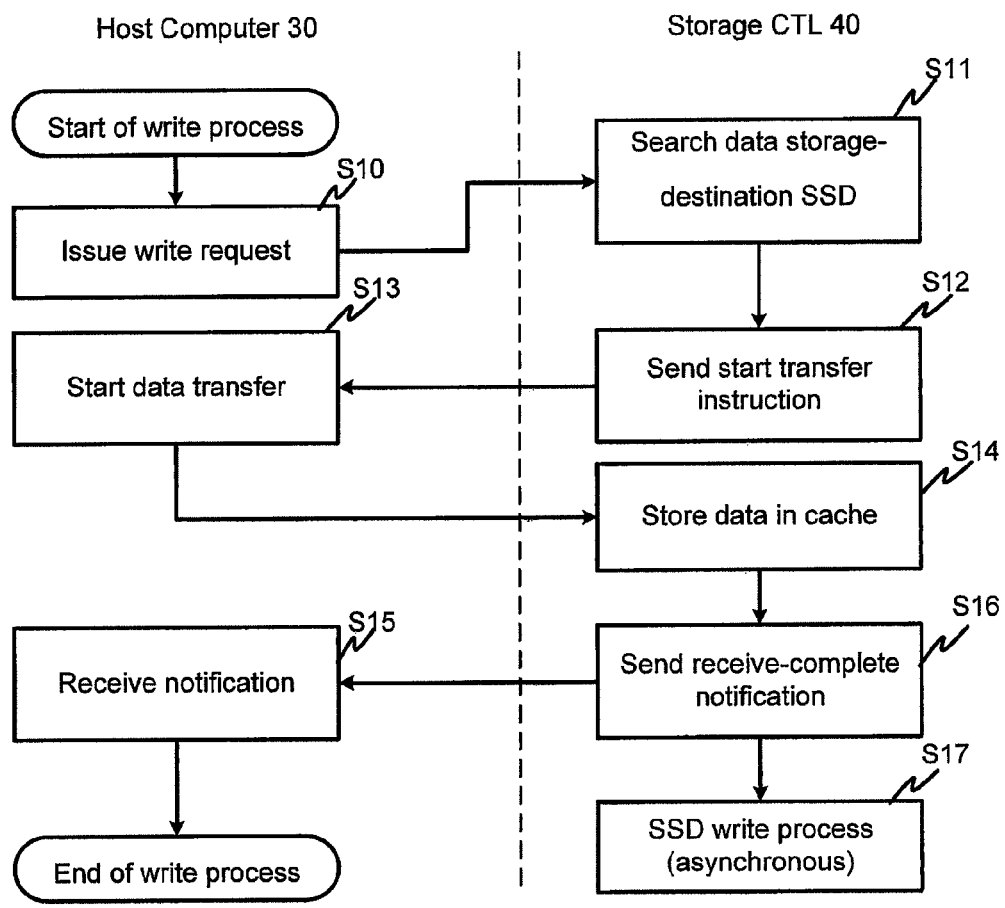
FIG. 17 is a flowchart showing an example of the flow of processing by which a host computer 30 writes data to a storage apparatus 10.

FIG. 17 is a flowchart showing an example of the flow of processing by which the host computer 30 writes data to storage apparatus 10. Each step of FIG. 17 will be explained below.

The host computer 30 issues a write request to the storage controller 40 (S10).

The CPU 460 receives the write request from the host computer 30 and identifies the data storage-destination SSD from the write-destination address recorded in this write request (S11).

After identifying the data storage-destination SSD, the CPU 460 sends a data transfer start instruction to the host computer 30 (S12).

The host computer 30 receives the data transfer start instruction, and starts transferring the data to the storage controller 40 (S13).

The CPU 460 stores the data transferred from the host computer 30 in the cache memory 450 temporarily (S14).

The CPU 460 sends a notification to the host computer 30 that data receipt is complete (S16).

The host computer 30 receives the receive-complete notification and ends the relevant write process (S15).

Furthermore, at this point in time, the data is stored in the cache memory 450 as-is, and the CPU 460 writes the data to the SSD at an arbitrary time (S17). A process like that of S17 may be called a Post write. This process shortens the write response time (enhances performance). Moreover, the process of S17 may be carried out prior to the process of S16.

Figure 18:
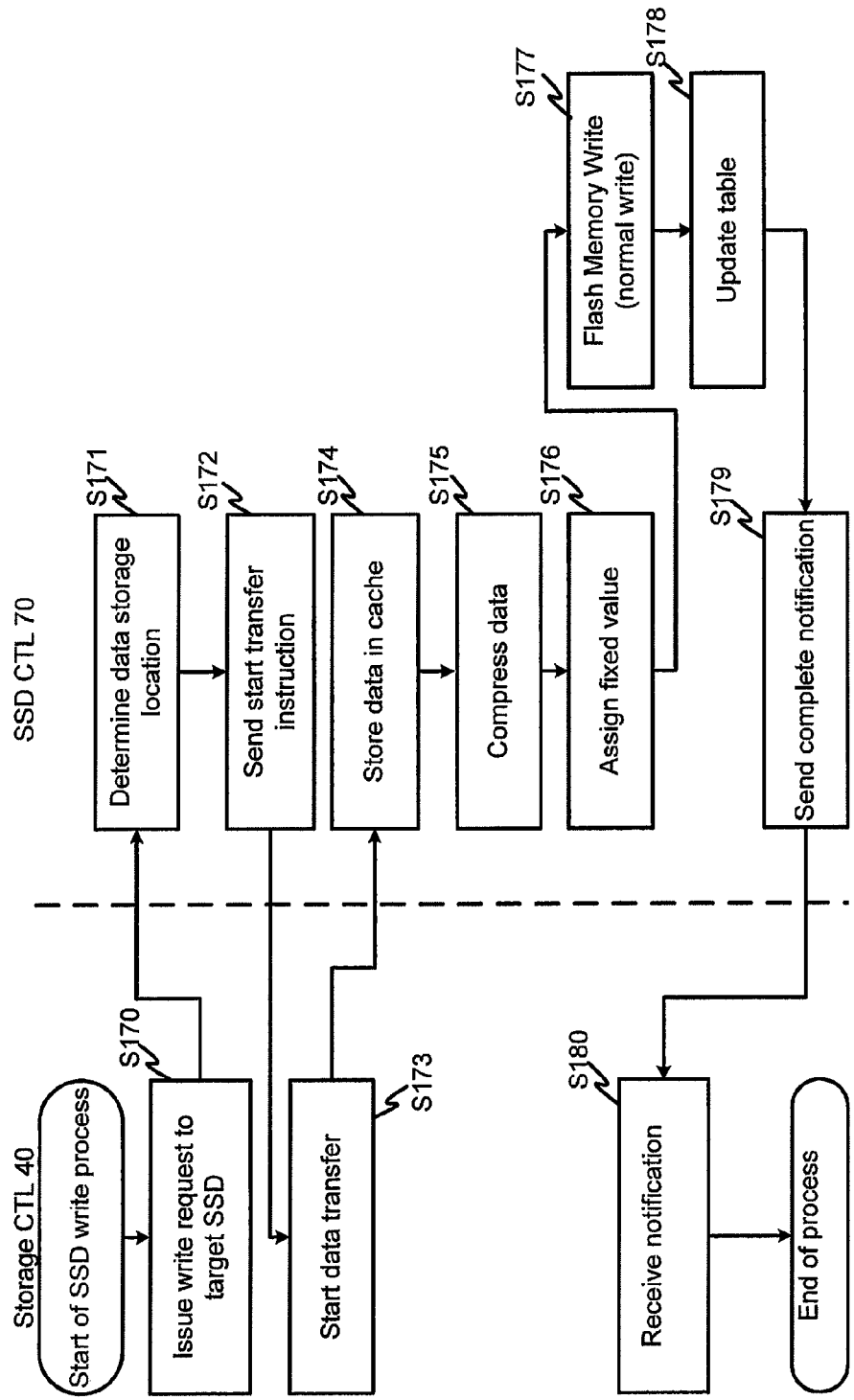
FIG. 18 is a flowchart showing an example of the processing by which a storage controller 40 transfers data to a SSD controller 70.

FIG. 18 is a flowchart showing an example of the flow of processing by which the storage controller 40 transfers the data to the SSD controller 70.

The CPU 460, which controls the storage controller 40, issues a write request to the SSD controller 70 (S170).

When the SSD controller 70 receives the write request, the CPU 760 of the SSD controller 70 refers to the address conversion table 850 and determines the page (the data write-destination physical page according to the write request) 783 corresponding to the logical page according to the write request (S171).

Thereafter, the CPU 760 sends a data transfer start instruction to the storage controller 40 (S172).

The storage controller 40 receives the data transfer start instruction and starts transferring the data (S173).

The CPU 760 stores the received data in the cache memory 750 (S174).

The CPU 760 boots the compress engine 731, and the compress engine 731 compresses the received data (S175) and assigns a fixed value to the compressed data (S176).

The CPU 760 boots the DMA engine 733 and writes the data to the flash memory 780 using a normal write process. An ECC is created by the ECC engine 733 with respect to the data area comprising the compressed data and fixed value at this time, and this data area and this created ECC are transferred to the flash memory 780 (S177).

CPU 760 updates the address conversion table 850 and the data structure management table 860 (S178). For example, in a case where the physical page allocation with respect to the logical page has changed, the CPU 760 changes the physical page no. 8501 corresponding to this logical page no. 8500 in the address conversion table 850. Furthermore, the CPU 760 writes the information 8601 through 8605 with respect to the data write-destination physical page to the data structure management table 860.

The CPU 760 sends a notification to the storage controller 40 that the data transfer is complete (S179).

The storage controller 40 receives the data transfer complete notification and ends this processing (S180).

Figure 19:
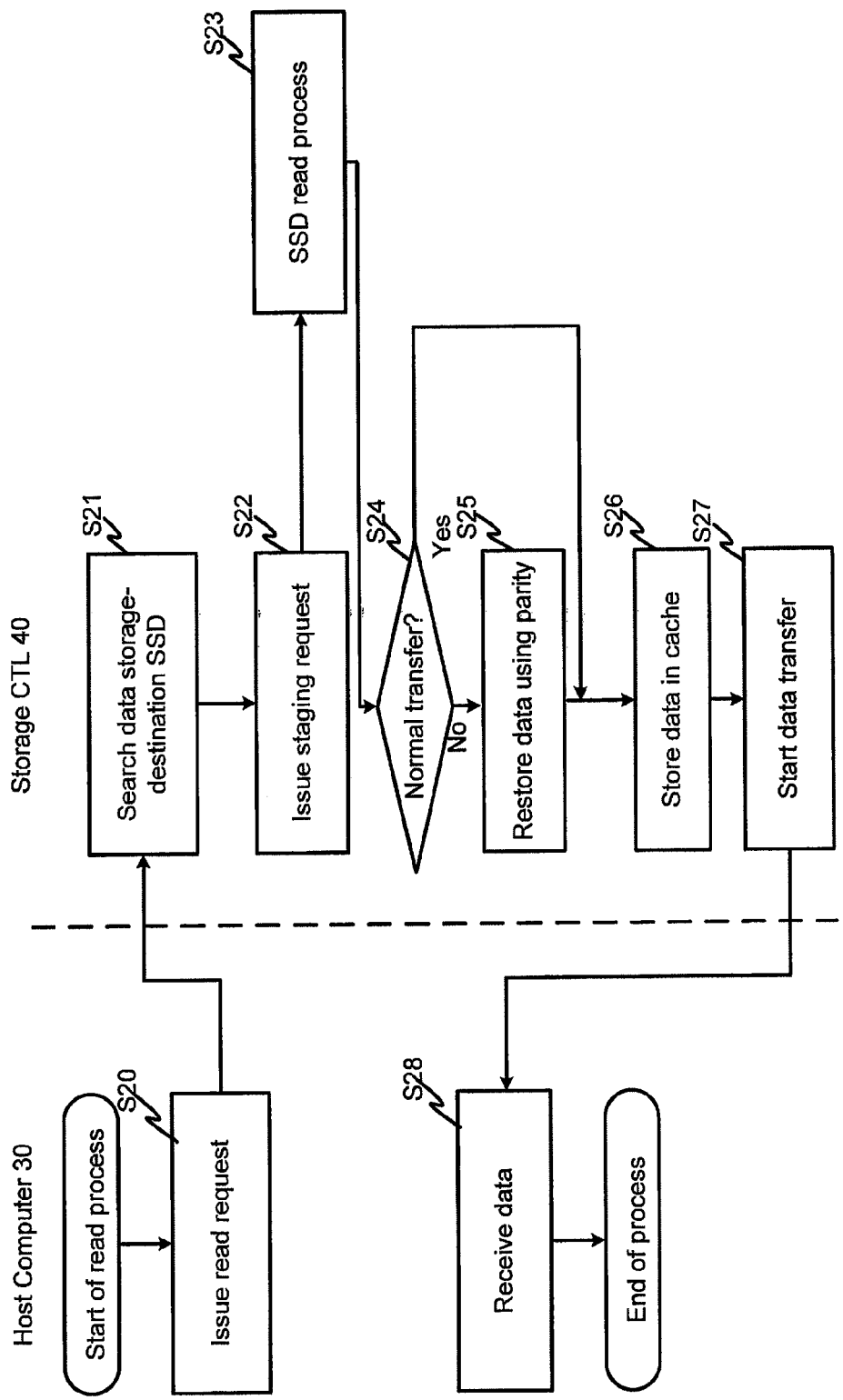
FIG. 19 is a flowchart showing an example of the flow of processing by which the host computer 30 reads data from the storage apparatus 10.

FIG. 19 is a flowchart showing an example of the flow of processing by which the host computer 30 reads data from the storage apparatus 10.

The host computer 30 issues a data read request to the storage controller 40 (S20).

When the storage controller 40 receives the read request, the CPU 460 of the storage controller 40 identifies the data storage-destination SSD 60 from the address recorded in this read request (S21).

The CPU 460 requests that the SSD controller 70, which controls the SSD 60, perform a data transfer (FIG. 19: Step S22). Hereinafter, this kind of request will be called a "staging request".

The SSD controller 70 receives the staging request and executes processing according to this request (S23). This processing will be explained in detail using FIG. 20.

The CPU 460 determines whether or not the read process ended normally based on the response message of the SSD 60 (S24).

In a case where the result of the determination of S24 is negative (S24: No), the storage controller 40 executes a data restoration using the RAID group parity (S25). This is because an uncorrectable error may have occurred in the SSD 60.

The CPU 460 stores the data restored using the parity in the cache memory 450 (S26).

Alternatively, in a case where the result of the determination of S24 is affirmative (S24: Yes), the CPU 460 stores the data transferred from the SSD 60 in the cache memory 450 (S26).

Thereafter, the CPU 460 transfers the data stored in the cache memory 450 to the host computer 30 (S27).

The host computer 30 receives the data from the storage controller 40 and ends this processing (S28).

Figure 20:
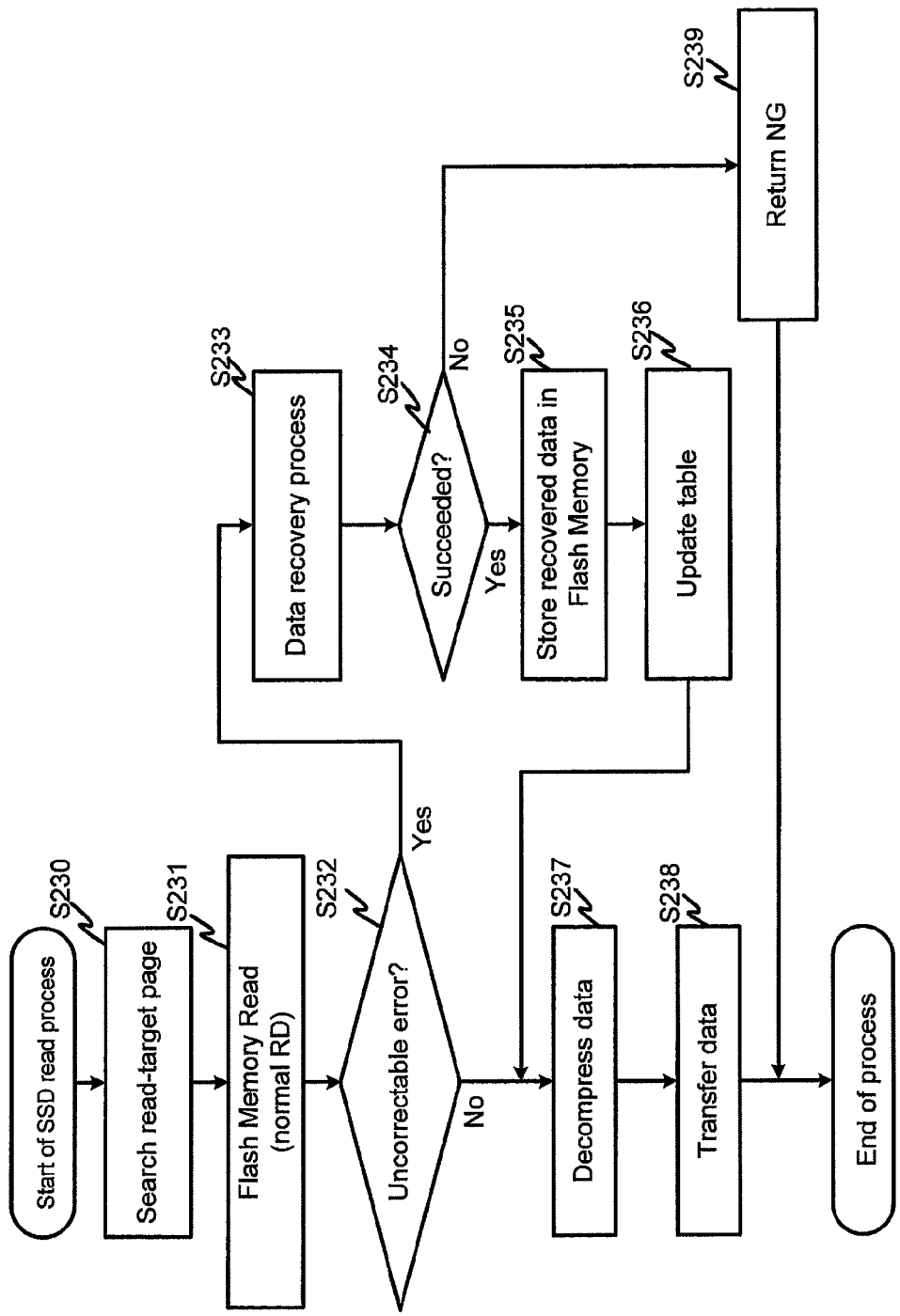
FIG. 20 is a flowchart showing a detailed example of S23 of FIG. 19.

FIG. 20 is a flowchart showing a detailed example of S23 of FIG. 19.

The CPU 760 (SSD controller 70) refers to the address conversion table 850 and identifies the page (the read-source physical page) 780 corresponding to the logical page according to the staging request (S230).

The CPU 760 executes a data group set read from the page identified in S230 using a normal read (S231). Because it is a normal read, the read data group set is inputted to the ECC engine 733. The ECC engine 733 detects whether or not an uncorrectable error has occurred in this data group set and writes this detection result to the end list 820.

After the normal read process had been completed, the CPU 760 refers to the DMA engine end list 820 and checks for the occurrence of an uncorrectable error (S232).

In a case where an uncorrectable error has not occurred (S232: No), the CPU 760 executes a decompression process with respect to the read data using the compress engine 731 (S237).

After data decompression has been completed, the CPU 760 transfers the data to the storage controller 40 and ends this processing (S238).

Alternatively, in a case where an uncorrectable error has occurred (S232: Yes), the CPU 760 executes a data recovery process (S233). Step S233 will be explained in detail using FIG. 21.

The CPU 760 acquires information denoting the result of the data recovery process, and in a case where recovery succeeded, advances processing to step S235, and in a case where recovery failed, advances processing to step S239 (S234).

In a case where the data recovery process succeeded (S234: Yes), the recovered data is stored in the cache memory 750, and as such, the CPU 760 stores the recovered data in the flash memory 780 in accordance with a normal write (S235).

After the data write has been completed, the CPU 760 updates the address conversion table 850 and the data structure management table 860, and advances processing to the above-mentioned step S237 (S236).

Alternatively, in a case where the data recovery failed (S234: No), the CPU 760 notifies the host computer 30 of the recovery process failure and ends this processing (S239).

Figure 21:
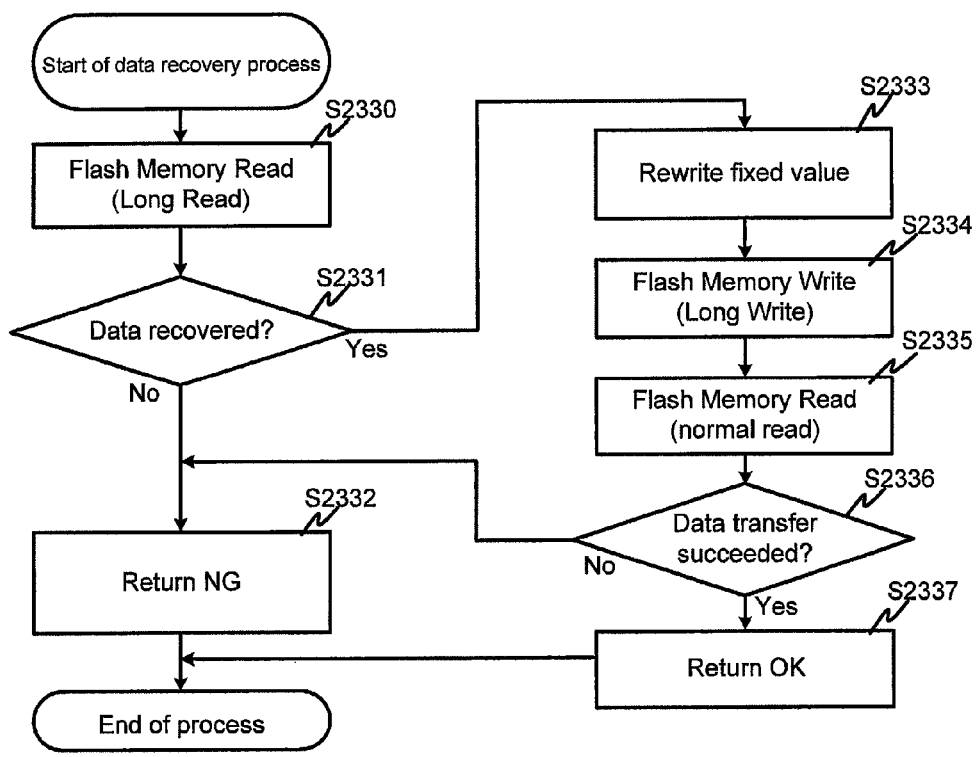
FIG. 21 is a flowchart showing a detailed example of S233 of FIG. 20.

FIG. 21 is a flowchart showing a detailed example of S233 of FIG. 20.

First, the CPU 760 (SSD controller 70) executes a long read with respect to the page in which the uncorrectable error occurred, and stores the data group set comprising the ECC inside the cache memory 750 from the flash memory 780 (S2330).

Next, the CPU 760 determines the likelihood of data recovery (S2331). Specifically, for example, the CPU 760 checks whether or not an error bit is included in the fixed value by comparing the value (prescribed fixed value) recorded in the fixed value data pattern 8604 of the data structure management table 860 to the fixed value in the data group set that underwent the long read. In a case where an error bit is not included in the fixed value at this time, the CPU 760 determines that there is no chance of a data recovery and advances the processing to step S2332. This is because, in a case where an error bit is not included in the fixed value, it is not possible for the total number of error bits in the data group to fall within the range capable of being corrected by the ECC. Alternatively, in a case where an error bit is included in the fixed value, the CPU 760 determines that there is a chance for data recovery and advances the processing to step S2333. This is because, in a case where an error bit is included in the fixed value, correcting the error bit in the fixed value could bring the total number of data group error bits within the ECC correctable range.

In a case where an error bit is not included in the fixed value (S2331: No), the CPU 760 notifies the higher-level device (for example, The storage controller 40) that the data recovery process failed and ends this processing (S2332).

In a case where an error bit is included in the fixed value (S2331: Yes), the CPU 760 writes the correct fixed value (the value of the fixed value data pattern 8604) (S2333). This revises the fixed value error bit.

Thereafter, the CPU 760 transfers the data group set comprising the data group with the revised fixed value to the flash memory 780 using a long write (S2334).

After the long write has ended, the CPU 760 carries out a normal read and executes error correction using the ECC engine 733 with respect to each data group in the data group set (S2335).

The CPU 760 refers to the transfer result 8201 of the DMA engine end list 820 to determine if the data transfer was successful or not (S2336).

In a case where the data transfer succeeded (S2336: Yes), that is, a case in which the transfer result 8201 is "OK", the CPU 760 notifies the higher-level device (for example, The storage controller 40) that the data recovery process succeeded and ends this processing (S2337).

Alternatively, in a case where the data transfer failed (S2336: No), that is, a case in which the transfer result 8201 is "NG", and the determination result of step S2331 is that there is no chance of data recovery, the CPU 760 notifies the higher-level device (for example, The storage controller 40) that the data recovery process failed and ends this processing (S2332).

According to the first example above, data is compressed, and a data group comprising the post-compression data, a fixed value, which is the same size as the proportion by which the size of the data was reduced in accordance with compression, and an ECC, is written to the flash memory 780. In a case where an uncorrectable error has occurred in the data group, the SSD controller 70 determines whether or not an error bit is included in the fixed value, and in a case where an error bit is included in the fixed value, corrects this fixed value. In a case where the total number of error bits in the data group falls within the ECC correctable range as a result of this, the data group can be recovered. That is, a correction can be made using the ECC even when an uncorrectable error has occurred in the data group.

Example 2

A second example of the present invention will be explained below. In so doing, the explanation will focus on the differences with the first example, and explanations of the points in common with the first example will be either simplified or omitted (this will also hold true for a third example, which will be described further below).

In the first example, the ECC engine 733, which is a piece of hardware, executes by ECC calculation an error bit correction at the time of a data recovery process (hereinafter, an error bit correction method like that of the first example will be called the "hardware method"). In the second example, a method in which the CPU 760 executes error bit correction at the time of a data recovery process (hereinafter, the software method) will be used.

Figure 22:
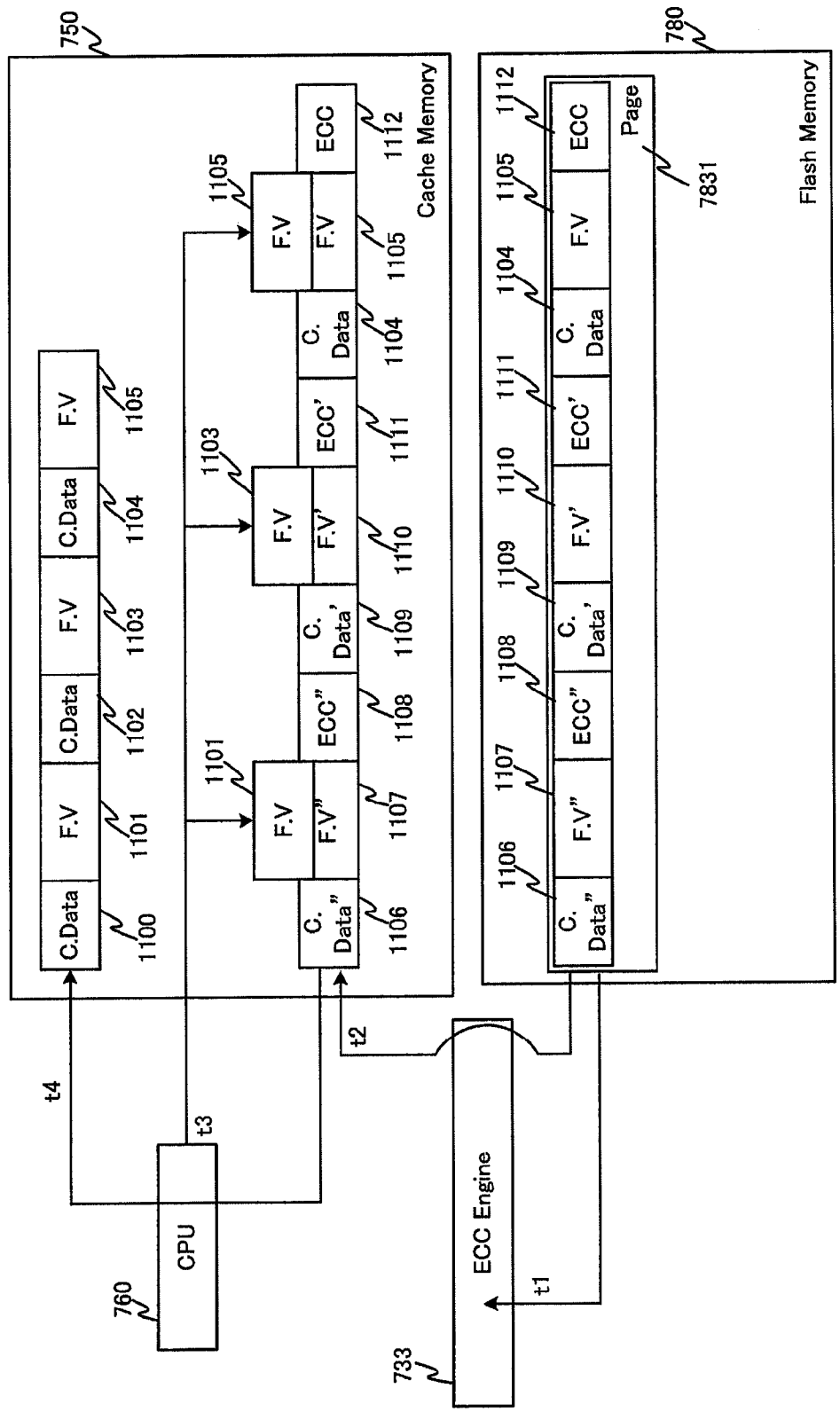
FIG. 22 is an outline diagram showing an example of a data restoration procedure in a second example.

FIG. 22 is an outline diagram showing an example of a data restoration procedure in the second example.

The same as in FIG. 8, data with a double quotation mark (") attached indicates data in which an uncorrectable error has occurred, data with a single quotation mark (') attached indicates data, which, although an error bit has occurred, is capable of being corrected using the ECC, and unmarked data indicates data in which an error has not occurred.

First, the CPU 760 reads the data group set stored in the page 7831 using a normal read, and checks whether or not an uncorrectable error has occurred with respect to each data group within the read data group set (t1).

In a case where an uncorrectable error has occurred in a read data group, the CPU 760 uses a long read to transfer the data group set (the three data groups in FIG. 22) stored in the page 7831 to the cache memory 750 as-is (t2). According to the example of FIG. 22, an uncorrectable error has occurred in the data group comprising the compressed data 1106, the fixed value 1107 and the ECC 1108.

Thereafter, the CPU 760 corrects the data group fixed value 1107 to the fixed value 1101. It is supposed that correcting the fixed value 1107 to the correct value 1101 brings the total number of error bits of the data group (the data group comprising the fixed value 1107 and the ECC 1108) within the range capable of being corrected by the ECC. Similarly, the CPU 760 corrects the fixed value 1110 of the other data group, in which an uncorrectable error did not occur, to the fixed value 1103. Furthermore, the CPU 760 overwrites the fixed value 1105 in which an error has not occurred with the fixed value 1105 (t3).

Next, the CPU 760 performs an ECC operation and carries out error bit detection and correction in data groups units. The CPU 760 uses the ECC 1108 to correct the compressed data 1106 to the compressed data 1100, and uses the ECC 1111 to correct the compressed data 1109 to the compressed data 1102. Then, the CPU 760 stores a data group set (a data area comprising the compressed data 1100 and the fixed value 1101, a data area comprising the compressed data 1102 and the fixed value 1103, and a data area in which an error did not occur comprising the compressed data 1104 and the fixed value 1105) from which the ECC (1108, 1111, 1112) have been excluded in the cache memory 750 (t4).

Figure 23:
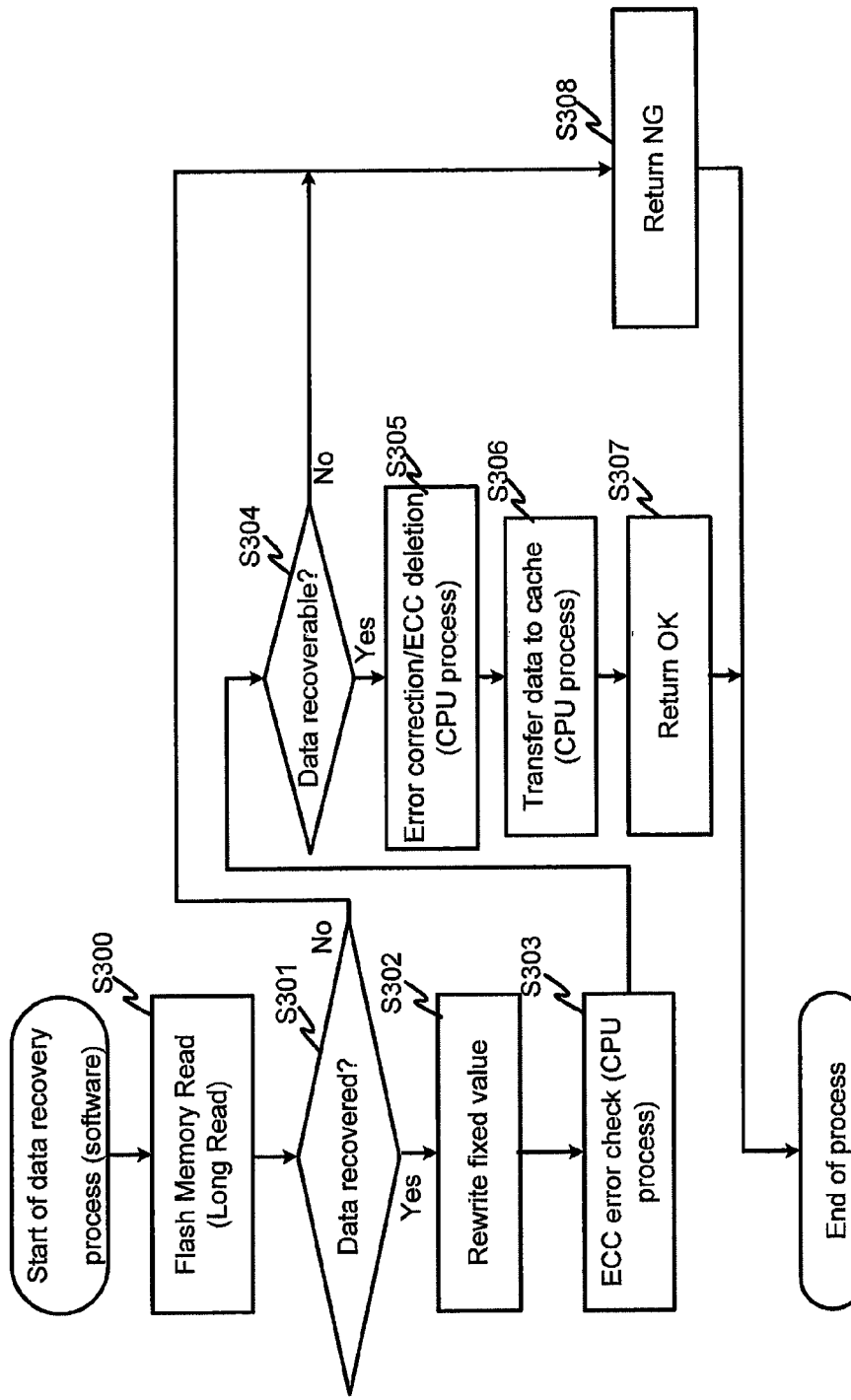
FIG. 23 is a flowchart showing an example of the flow of processing of a CPU 760 related to the second example.

FIG. 23 is a flowchart showing the flow of processing of the CPU 760 related to the second example.

The CPU 760 uses a long read to transfer a data group set comprising a data group in which an uncorrectable error has occurred from a page to the cache memory 750 (S300).

Next, the CPU 760 determines whether or not an error bit exists in the fixed value of the data group in which the uncorrectable error has occurred, in other words, whether or not the data group in which the uncorrectable error occurred can be recovered (S301).

In a case where the data is not recoverable (S301: No), the CPU 760 notifies the higher-level device (for example, The storage controller 40) that data recovery failed (S308).

Alternatively, in a case where the data is recoverable (S301: Yes), the CPU 760 corrects the fixed value of the read data group to the correct fixed value in the cache memory 750 (S302).

Thereafter, the CPU 760 carries out a software-based ECC operation with respect to each data group in which the fixed value was corrected, and determines whether or not the total number of error bits falls within the correctable range (S303).

In a case where error correction is not possible (S304: No), that is, a case in which data recovery is impossible, the CPU 760 notifies the higher-level device (for example, The storage controller 40) that data recovery failed (S308).

In a case where error correction is possible (S304: Yes), that is, a case in which data recovery is possible, the CPU 760 executes a compressed data recovery process inside the data group (S305). In S305, the CPU 760 uses software to execute compressed data error correction and ECC deletion.

The CPU 760 transfers the corrected correct data obtained in S305 (multiple data areas comprising corrected compressed data and fixed values) to the cache memory 750 (S306).

Thereafter, the CPU 760 notifies the higher-level device (for example, The storage controller 40) that data recovery processing succeeded and ends this processing (S307).

The characteristics of the hardware method (first example) and the software method (second example) will be sorted out here.

The hardware method is advantageous in that the ECC engine 733 executes the ECC processing, thereby lessening the load on the CPU (reduces CPU performance drops). However, the disadvantage is that the data group set must be subjected to a long write in the flash memory, thereby shortening the life of the flash memory. This is because the blocks comprising the flash memory can only be erased a limited number of times.

By contrast, the software method is disadvantageous because the CPU executes the ECC processing, thereby increasing the load on the CPU (lowering CPU performance). However, since a long write is not required after updating the fixed value, the number of writes to the flash memory is reduced. As a result, the life of the flash memory can be extended longer than with the hardware method.

Therefore, the hardware method and software method can be seen as processing methods with conflicting characteristics. Consequently, in a case where a data recovery process is to be executed, a process for selecting either the hardware method or the software method in accordance with the state of the storage system (a big load on the CPU, or a large number of flash memory erases) may be used. A number of criteria (standpoints) are possible for selecting either the hardware method or the software method, but in the following explanation, it will be supposed that there are two criteria, i.e., the size of the load on the CPU and the number of flash memory erases.

Figure 24:
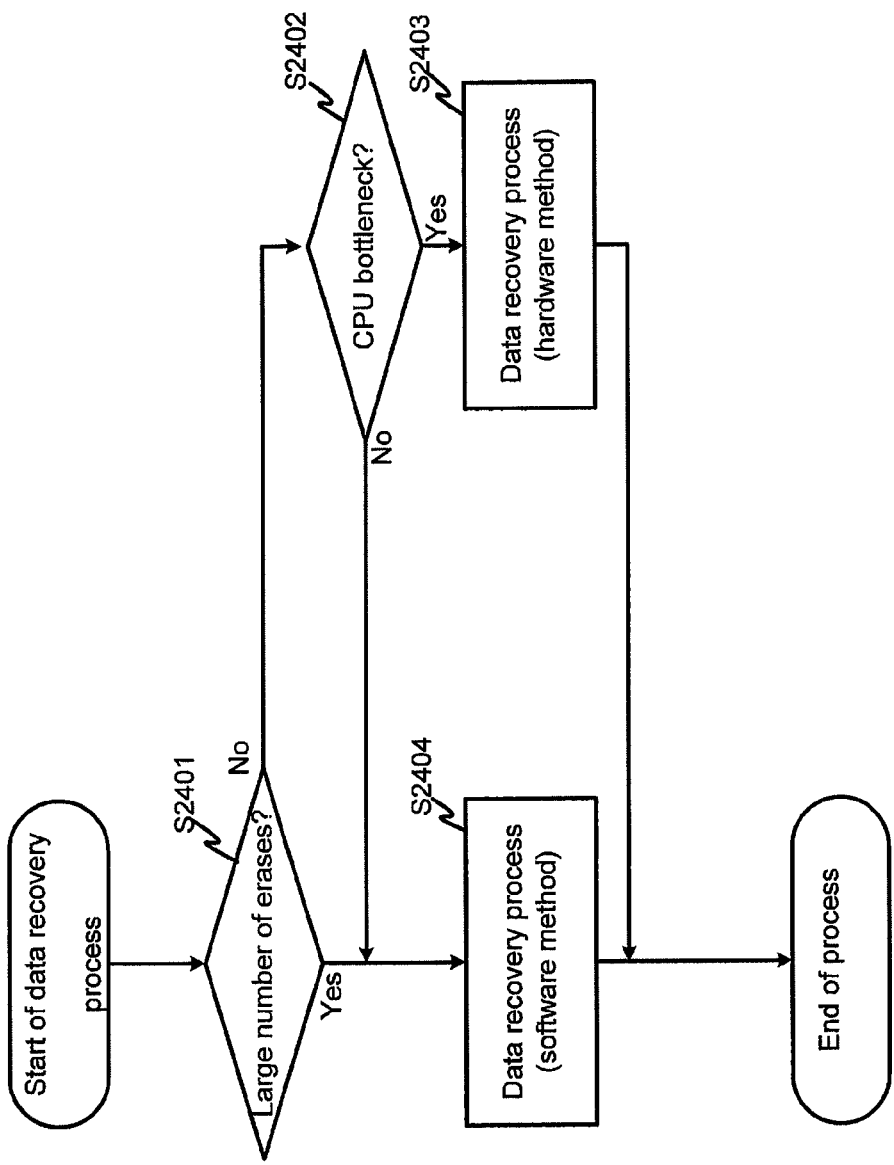
FIG. 24 is a flowchart showing a first example of a selection process in a data recovery method.

FIG. 24 is a flowchart showing a first example of the process for selecting a data recovery method.

In this process, priority will be placed on the size of the CPU load rather than the number of flash memory erases as the criteria.

First, the CPU 760 refers to the block management table 870 to determine whether or not the block to which the page 783 in which an uncorrectable error occurred belongs (will be called the "target block" in the explanation of FIG. 24) 782 has been erased a large number of times (S2401). Furthermore, whether or not the target block 782 has been erased a large number of times may be determined by whether or not a threshold has been exceeded. The threshold may be a value prepared in advance, or may be a value based on the number of erases of one or more physical blocks other than the target block 782 (for example, an average of the number of erases thereof).

In a case where the target block 782 has been erased a large number of times (S2401: Yes), the CPU 760 selects the data recovery process that uses the software method (S2402).

Alternatively, in a case where the target block 782 has not been erased a large number of times (S2401: No), the CPU 760 refers to the CPU utilization management table 880 to check whether or not the load on the CPU 760 exceeds a prescribed load (S2402).

In a case where the load on the CPU 760 exceeds the prescribed load (S2402: Yes), the CPU 760 selects the data recovery process that uses the hardware method to avoid a drop in CPU performance in accordance with data recovery processing (S2403).

Alternatively, in a case where the load on the CPU 760 is equal to or less than the prescribed load (S2403: No), the CPU 760 selects the software-based data recovery process (S2404).

Figure 25:
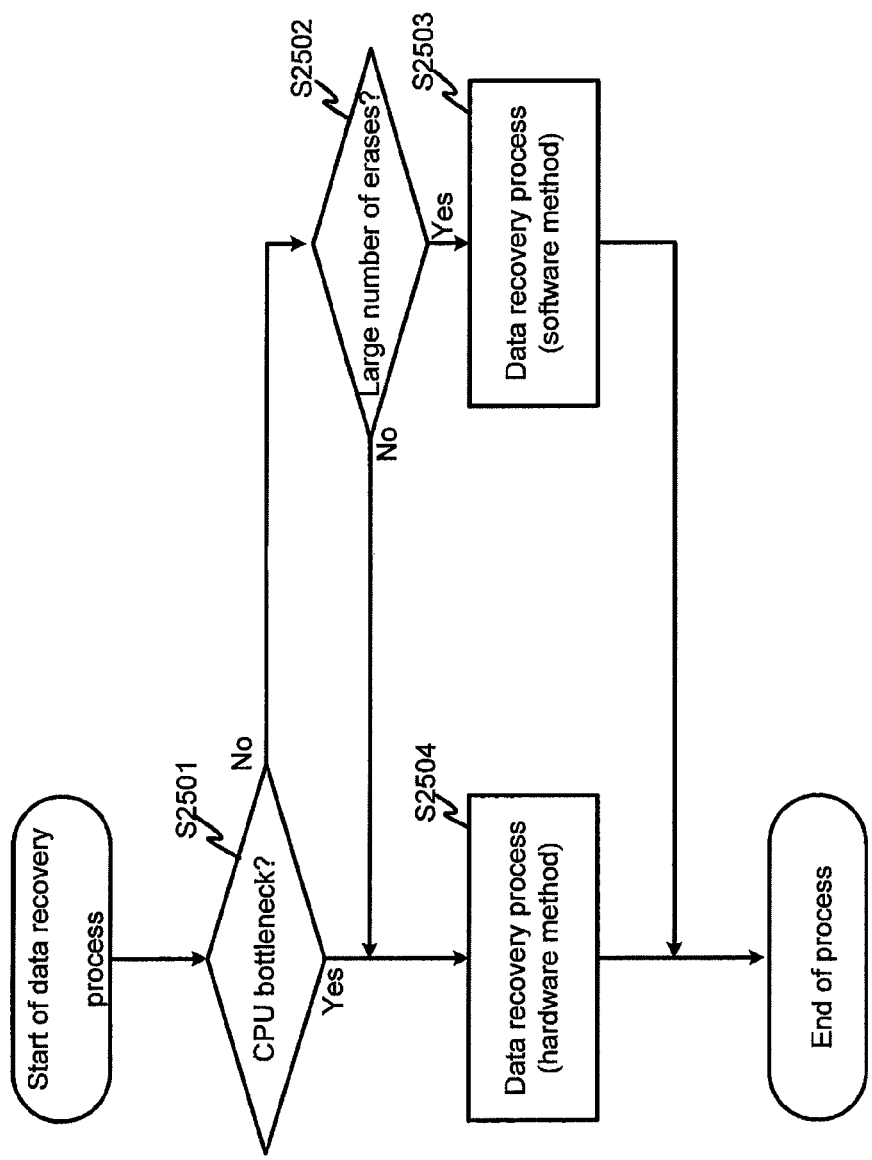
FIG. 25 is a flowchart showing a second example of a selection process in a data recovery method.

FIG. 25 is a flowchart showing a second example of the process for selecting the data recovery method.

In this process, priority will be placed on the number of flash memory erases rather than the size of the CPU load as the criteria.

First, the CPU 760 refers to the CPU utilization management table 880 to check whether or not the load on the CPU 760 exceeds a prescribed load (S2501).

In a case where the load on the CPU 760 exceeds a prescribed load (S2501: Yes), the CPU 760 selects the hardware method-based data recovery process to avoid a drop in CPU performance due to data recovery processing (S2504).

In a case where the CPU 760 load is equal to or less than the prescribed load (S2501: NO), the CPU 760 refers to the block management table 870 to determine whether or not there has been a large number of erases of the block comprising the page 783 in which the uncorrectable error occurred (will be called the "target block" in the explanation of FIG. 25) 782 (S2502). The determination as to whether or not there have been a large number of target block 782 erases may be the same determination explained using FIG. 24.

In a case where there has been a large number of target block 782 erases (S2502: Yes), the CPU 760 selects the software method-based data recovery process (S2503).

Alternatively, in a case where there has not been a large number of target block 782 erases (S2502: No), The CPU 760 selects the hardware method-based data recovery process (S2504).

As described above, according to the software method, the number of flash memory writes can be reduced by the CPU 760 executing the ECC operation, thereby making it possible to extend the life of the flash memory more than with the hardware method. However, there is a danger of the performance of the CPU 760 dropping in accordance with the software method. Therefore, as mentioned hereinabove, it is preferable that the selection of either the hardware method or the software method be determined as needed in accordance with the CPU load and the number of target block erases.

Furthermore, in a case where the CPU 760 comprises a dedicated circuit for ECC operations, this dedicated circuit may be used in the software method.

Example 3

In the first and second examples, in a case where even one uncorrectable error has occurred in one data group of multiple data groups, which are stored in a page 783, first the CPU 760 transfers the data group set, which comprises the data group in which the uncorrectable error occurred and the other data group(s) in which an uncorrectable error has not occurred, from the page 783 to the cache memory 750. Thereafter, the CPU 760 executes the data recovery process in accordance with uniformly rewriting the fixed values on the cache memory 750.

In the third example, only the data group in which the uncorrectable error has occurred is targeted for data recovery using a normal read.

Figure 26:
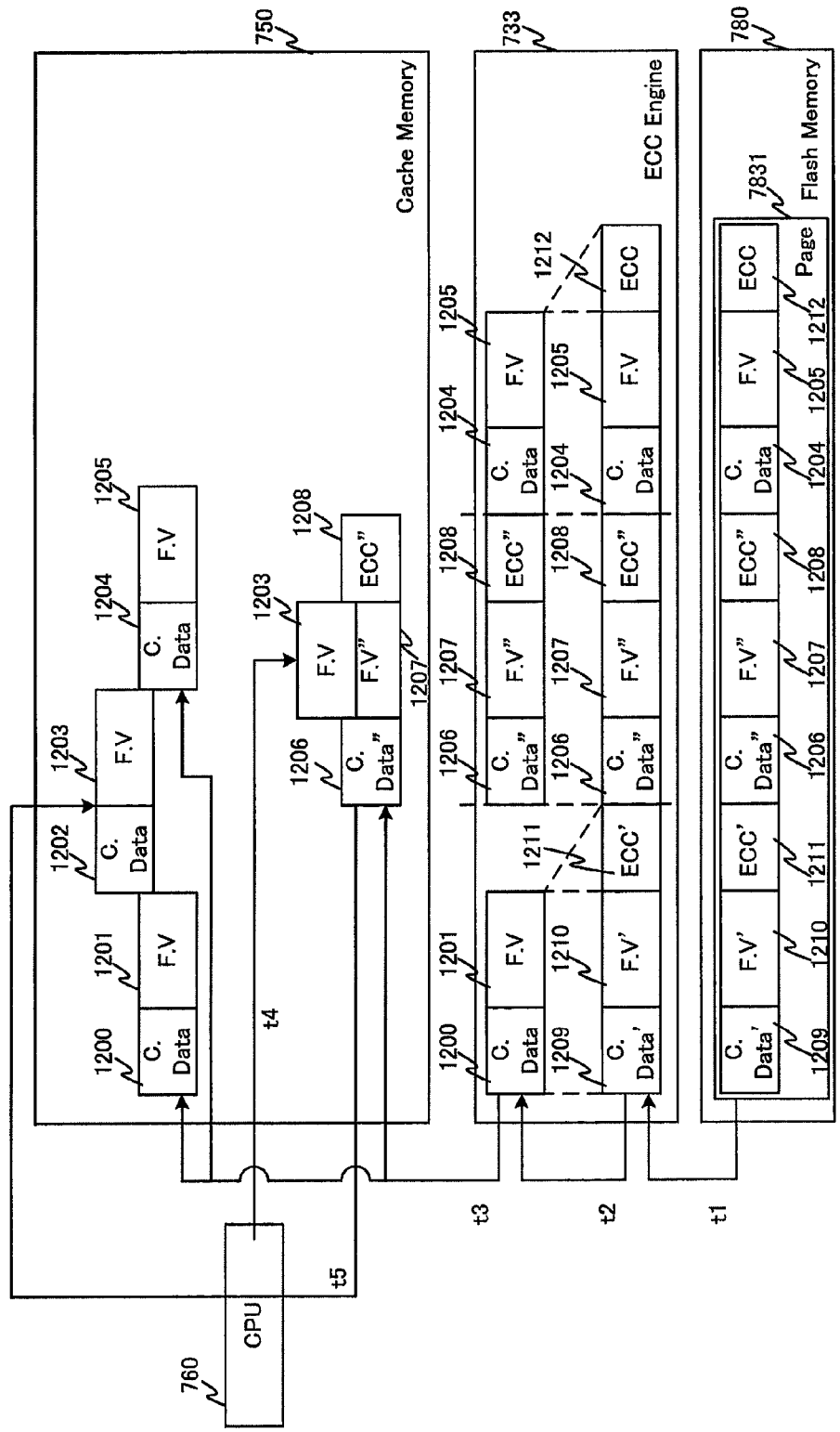
FIG. 26 is an outline diagram showing an example of a data restoration procedure in a third example.

FIG. 26 is an outline diagram of a data restoration procedure in the third example.

To begin with, the CPU 760 uses a normal read to read the data group set stored in the page 7831, and checks whether or not this data group set includes a data group in which an uncorrectable error has occurred (t1).

According to the example of FIG. 26, an uncorrectable error has occurred in the data group comprising the compressed data 1206, the fixed value 1207, and the ECC 1208. Furthermore, a correctable error has occurred in the data group comprising the compressed data 1209, the fixed value 1210, and the ECC 1211. Also, no errors have occurred in the data group comprising the compressed data 1204, the fixed value 1205, and the ECC 1212.

Based on the characteristics of the ECC engine 733, it is clear whether the data group comprises an uncorrectable error, comprises an error that is able to be corrected by the ECC, or does not comprise an error when a data group passes through the ECC engine 733. The ECC engine 733 performs the following processing with respect to the data group comprising the compressed data 1209, the fixed value 1210, and the ECC 1211 (that is, the data group comprising the error that is able to be corrected using the ECC) (t2).

(*) Uses the ECC 1211 to correct the compressed data 1209 to the correct compressed data 1200.

(*) Uses the ECC 1211 to correct the fixed value 1210 to the fixed value 1201, which is the correct data.

Furthermore, the ECC engine 733 deletes the ECC 1212 from the data group comprising the compressed data 1204, the fixed value 1205, and the ECC 1212 (that is, the data group that does not comprise an error) (t2).

Furthermore, because an uncorrectable error has occurred in the data group comprising the compressed data 1206, the fixed value 1207, and the ECC 1208, the ECC engine 733 does not perform an error correction process (a correction using the ECC 1208) with respect to this data group (t2).

The ECC engine 733 respectively transfers a data area comprising the corrected compressed data 1200 and fixed value 1201, a data area comprising the compressed data 1204 and the fixed value 1205, and the data group in which the uncorrectable error occurred (the compressed data 1206, the fixed value 1207, and the ECC 1208) to the cache memory 750. The ECC engine 733 notifies the CPU 760 as to the result of this transfer (t3).

The CPU 760 receives the transfer result from the ECC engine 733, and corrects the fixed value 1207 of the data group in which the uncorrectable error occurred to the correct fixed value 1203 (t4).

The CPU 760 uses the ECC 1208 to correct the compressed data 1206 to the correct compressed data 1202 in accordance with a software operation. The CPU 760 stores the compressed data 1202 and the fixed value 1203 in the cache memory 750, thereby ending the sequence of data recovery processing (t5).

According to the third example above, only the data group in which the uncorrectable error occurred is the target of the data recovery process, thereby making it possible to reduce the CPU resources required for the data recovery process and minimize the drop in CPU performance.

A number of examples have been explained hereinabove, but the present invention is not limited to these examples. For example, a storage device other than the SSD (for example, a HDD) can be used as the storage device. Furthermore, a guarantee code other than the ECC may be used.

Furthermore, the data does not always have to be compressed when storing the data in the flash memory. For example, one page worth of data may be partitioned among multiple pages, and the data stored in each page may comprise a data area comprising the partitioned uncompressed data and a fixed value, and a guarantee code with respect to this data area.

Furthermore, in a case where write-target data does not satisfy the page size, a method in which a fixed value is written to an unused area without compressing the write-target data may be used.

Furthermore, when storing highly important data, such as storage apparatus management information, the CPU 760 may increase the size of the fixed value (In other words, the size of the actual data targeted for protection by the ECC (for example, the compressed data or partitioned data) may be decreased.). This is because making the size of the fixed value larger improves the likelihood of being able to recover data from an uncorrectable error. There are methods for increasing the size of the fixed value, such as partitioning the data among multiple pages, compressing the data, or partitioning the data among multiple pages after compressing the data. Whether write-target data is important or not can be identified using various methods. For example, the host computer 30 or the storage controller 40 may notify the CPU 760 of information denoting the importance of the data, and the importance of the data may be identified based on the data storage-destination address.

Furthermore, the compression of the data, the creation of the fixed value, and the assigning of the ECC may be collectively executed on the fly when writing data that has been stored in the cache memory 750 to the flash memory 780. Alternatively, ECC-based error correction and data decompression may be collectively executed on the fly when reading data from the flash memory 780.

Furthermore, for example, the processing carried out by the CPU 760 may be carried out by the CPU 460 instead of the CPU 760. The storage controller 40 may comprise the same functions as the SSD controller 70.

Furthermore, for example, the SSD 60 may be coupled to the host computer 30 via not the storage controller 40 but the I/F chip 710.

REFERENCE SIGN LIST

10: Storage apparatus

The invention claimed is:

1. A storage control apparatus comprising:
a communication interface device, which is coupled to a storage device having multiple storage areas;
a storage resource; and
a controller, which is coupled to the communication interface device and the storage resource,
wherein the controller is configured to perform write processing including:
creating a fixed value, including one or more values that conform to a prescribed data pattern, with respect to a first data, wherein the fixed value is smaller in size than the storage area;
creating a guarantee code related to a data area including the first data and the fixed value; and
writing a data group including the data area and the guarantee code to the storage area, and
the controller is further configured to perform read processing including:
reading the data group from the storage area;
determining whether a number of errors in the read data group is greater than a number of errors correctable by the guarantee code;
in a case where the number of errors in the read data group is greater than the number of errors correctable by the guarantee code, determining whether there is an error in the fixed value; and
in a case where there is an error in the fixed value, correcting the error in the fixed value without using the guarantee code to a corrected fixed value that conforms to the prescribed data pattern, thereby reducing the number of errors in the read data group to a number such that the remaining errors in the first data are correctable by the guarantee code.

2. The storage control apparatus according to claim 1, wherein in a case where a size of data to be written is equal to a size of the storage area, the controller creates the first data by making the size of the data to be written to be smaller than the size of the storage area.

3. The storage control apparatus according to claim 2, wherein the controller includes the storage resource and a processor coupled to the storage resource, the processor configured to correct the fixed value, in which there is an error on the storage resource, to the corrected fixed value that conforms to the prescribed data pattern.

4. The storage control apparatus according to claim 3, wherein:
the controller includes a guarantee code creation engine, which is a hardware circuit for creating the guarantee code,
the read data group is inputted to the guarantee code creation engine, and
the guarantee code creation engine determines whether the number of errors in the read data group is greater than the number of errors correctable by the guarantee code.

5. The storage control apparatus according to claim 3, wherein:
in the write processing, a data group set including multiple data groups is written to the storage area,
the controller includes a guarantee code creation engine, which is a hardware circuit for creating the guarantee code,
in the read processing, a data group read from the storage area is inputted to the guarantee code creation engine, and the guarantee code creation engine determines whether the read data group includes a number of errors greater than the number of errors correctable by the guarantee code,
with respect to a data group including a number of errors equal to or less than the number of errors correctable by the guarantee code, the guarantee code creation engine corrects an error using the guarantee code in the data group, and outputs a data area, which is a data group from which the guarantee code has been deleted,
with respect to a data group including a number of errors greater than the number of errors correctable by the guarantee code, the guarantee code creation engine outputs the data group without deleting the guarantee code,
the processor, in a case where a data group from which the guarantee code has not been deleted exists at the storage resource, corrects the fixed value inside the data group to a corrected fixed value, and
in a case where a data area, which is a data group from which the guarantee code has been deleted, exists at the storage resource, the processor does not correct the fixed value inside the data area.

6. The storage control apparatus according to claim 4, wherein:
in the write processing, a data group set including multiple data groups is written to the storage area,
in the read processing, the processor reads the data group set to the storage resource such that the data group set bypasses the guarantee code creation engine, and corrects the respective fixed values included in the data group set to the corrected fixed values regardless of whether the fixed values include errors.

7. The storage control apparatus according to claim 6, wherein:
the storage device is a flash memory, including multiple blocks and in which erasing is carried out in block units, each of the blocks includes multiple pages,
the storage area is a page,
the storage device is able to write data to an erased page, and
the read processing further includes:
the processor writing a second data group set, which is a data group set in which all the fixed values have been corrected, to a second page, which is a page other than a first page, which is a page that the data group was originally read from, so as to bypass the guarantee code creation engine;
the processor reading the second data group set from the second page; and
inputting the second data group set to the guarantee code creation engine, the guarantee code creation engine using a guarantee code to correct an error in each of the data groups in the second data group set.

8. The storage control apparatus according to claim 6, wherein in the read processing, the processor performs error correction using the guarantee code with respect to each data group in the second data group set at the storage resource.

9. The storage control apparatus according to claim 6, wherein the read processing further includes:
   the processor writing a second data group set, which is a data group set in which all the fixed values have been corrected, to a second storage area, which is a storage area other than a first storage area, which is a storage area that the data group was originally read from, so as to bypass the guarantee code creation engine;
   the processor reading the second data group set from the second storage area; and
   inputting the second data group set to the guarantee code creation engine, the guarantee code creation engine performing error correction using a guarantee code with respect to each of the data groups in the second data group set.

10. The storage control apparatus according to claim 7, wherein the further read processing steps are performed in a case where a number of erases of the block including the first page is equal to or less than a threshold and/or a load of the processor exceeds a prescribed load.

11. The storage control apparatus according to claim 10, wherein in a case where the number of erases of the block including the first page exceeds the threshold and/or the processor load is equal to or less than a prescribed load,
   the processor performs error correction using the guarantee code with respect to each of the data groups in the second data group set at the storage resource.

12. The storage control apparatus according to claim 11, further comprising:
   multiple Solid State Drives (SSDs); and
   a storage controller for controlling the multiple SSDs, wherein each of the SSDs includes the flash memory, the communication interface device, and the controller.

13. The storage control apparatus according to claim 1, comprising:
   multiple storage device units; and
   a storage controller for controlling the multiple storage device units, wherein each of the storage device units includes the storage device, the communication interface device, and the controller.

14. A data management method, comprising:
performing write processing, including:
   creating a fixed value, including one or more values that conform to a prescribed data pattern, with respect to a first data, wherein the fixed value is smaller in size than a storage area in a storage device including multiple storage resources;
   creating a guarantee code related to a data area including the first data and the fixed value; and
   writing a data group including the data area and the guarantee code to the storage area, and
performing read processing, including:
   reading the data group from the storage area;
   determining whether a number of errors in the read data group is greater than a number of errors correctable by the guarantee code;
   in a case where the number of errors in the read data group is greater than the number of errors correctable by the guarantee code, determining whether there is an error in the fixed value; and
   in a case where there is an error in the fixed value, correcting the error in the fixed value without using the guarantee code to a corrected fixed value that conforms to the prescribed data pattern, thereby reducing the number of errors included in the read data group to a number such that the remaining errors in the first data are correctable by the guarantee code.

* * * * *